United States Patent
Murray et al.

(10) Patent No.: US 9,883,748 B2
(45) Date of Patent: Feb. 6, 2018

(54) TRAINING DEVICE FOR A SEATING DEVICE AND METHOD OF USING THE SAME

(71) Applicant: Knoll, Inc., East Greenville, PA (US)

(72) Inventors: Seth Murray, Piedmont, CA (US); Bret Recor, San Francisco, CA (US); Hendrik R. van Hekken, Allentown, PA (US); Michael Harper, Bethlehem, PA (US)

(73) Assignee: Knoll, Inc., East Greenville, PA (US)

( * ) Notice: Subject to any disclaimer, the term of this patent is extended or adjusted under 35 U.S.C. 154(b) by 0 days.

(21) Appl. No.: 15/369,100

(22) Filed: Dec. 5, 2016

(65) Prior Publication Data

US 2017/0079441 A1    Mar. 23, 2017

Related U.S. Application Data

(63) Continuation-in-part of application No. 15/144,942, filed on May 3, 2016, now Pat. No. 9,585,485, which is a continuation-in-part of application No. 15/150,599, filed on May 10, 2016, now Pat. No. 9,565,945.

(60) Provisional application No. 62/162,163, filed on May 15, 2015, provisional application No. 62/166,938, filed on May 27, 2015, provisional application No. 62/167,443, filed on May 28, 2015, provisional application No. 62/162,163, filed on May 15, 2015,
(Continued)

(51) Int. Cl.
*A47C 9/00*    (2006.01)
*A47C 7/00*    (2006.01)
*F16B 1/00*    (2006.01)
*A47C 3/02*    (2006.01)
*A47C 3/029*   (2006.01)

(52) U.S. Cl.
CPC ............... *A47C 9/002* (2013.01); *A47C 3/02* (2013.01); *A47C 3/029* (2013.01); *A47C 7/004* (2013.01); *F16B 1/00* (2013.01); *F16B 2001/0035* (2013.01)

(58) Field of Classification Search
None
See application file for complete search history.

(56) References Cited

U.S. PATENT DOCUMENTS 3,312,437 A    4/1967  Barth
4,029,278 A *  6/1977  Napoleon ............. A47C 7/008
                                                248/164
(Continued)

FOREIGN PATENT DOCUMENTS

EP    1614370 A1 *  1/2006  ............... A47C 1/12

*Primary Examiner* — David E Allred
(74) *Attorney, Agent, or Firm* — Buchanan Ingersoll & Rooney PC

(57) ABSTRACT

A seating device includes a training device connected to a component of the base of the seating device. The training device is configured to tilt the seating device to help a user learn how to use the seating device to help the user avoid losing the user's balance while sitting or leaning on the seat of the seating device when the user initially starts to use the seating device. The training device can be releasable from the base of the seating device after the user has learned how to balance on the seating device. The training device can also be reattachable to the seating device to facilitate the training of other users.

23 Claims, 15 Drawing Sheets

Related U.S. Application Data provisional application No. 62/264,371, filed on Dec. 8, 2015.

(56) References Cited

U.S. PATENT DOCUMENTS

| | | | |
|---|---|---|---|
| 4,047,753 A * | 9/1977 | Uchida | A47C 3/029 |
| | | | 297/131 |
| 4,130,263 A | 12/1978 | Roericht | |
| 4,285,543 A * | 8/1981 | Clark | A47C 3/029 |
| | | | 297/133 |
| 4,652,050 A | 3/1987 | Stevens | |
| 4,676,551 A * | 6/1987 | McDowell | A47C 9/00 |
| | | | 248/188.9 |
| 4,738,487 A | 4/1988 | Shalinsky et al. | |
| 5,112,103 A | 5/1992 | Downer | |
| 5,203,853 A | 4/1993 | Caruso | |
| 5,494,333 A * | 2/1996 | Wilson | A47C 7/002 |
| | | | 248/188.5 |
| 5,513,900 A * | 5/1996 | Iglesias | A47C 7/002 |
| | | | 248/501 |
| 5,683,139 A | 11/1997 | Golynsky et al. | |
| 5,769,371 A * | 6/1998 | Bandur | A47C 7/002 |
| | | | 248/157 |
| 5,775,774 A | 7/1998 | Okano | |
| 5,997,087 A | 12/1999 | Stumpf | |
| 6,132,002 A * | 10/2000 | Brown, II | A47C 13/00 |
| | | | 297/423.14 |
| 6,817,667 B2 | 11/2004 | Pennington et al. | |
| 6,824,218 B1 | 11/2004 | van Hekken | |
| 6,834,916 B2 | 12/2004 | Volkman et al. | |
| 6,880,886 B2 | 4/2005 | Bodnar et al. | |
| 6,957,863 B2 | 10/2005 | Heidmann et al. | |
| 6,997,511 B2 | 2/2006 | Marchand et al. | |
| 7,198,329 B1 | 4/2007 | Larson | |
| 7,293,827 B2 * | 11/2007 | Schrader | A45B 3/00 |
| | | | 135/66 |
| 7,478,878 B2 | 1/2009 | Oettinger | |
| 7,798,573 B2 | 9/2010 | Pennington et al. | |
| 7,887,131 B2 | 2/2011 | Chadwick et al. | |
| 7,922,248 B2 | 4/2011 | Aldrich et al. | |
| 3,029,060 A1 | 10/2011 | Parker et al. | |
| 8,136,876 B2 | 3/2012 | Belvis Castillo et al. | |
| 8,157,329 B2 | 4/2012 | Masoud et al. | |
| 8,167,373 B2 | 5/2012 | Allison et al. | |
| 8,216,416 B2 | 7/2012 | Allison et al. | |
| 8,220,872 B2 | 7/2012 | Hong | |
| D664,779 S | 8/2012 | Weber et al. | |
| 8,480,171 B2 | 7/2013 | Chadwick et al. | |
| 8,646,841 B2 | 2/2014 | Molnar | |
| 8,663,514 B2 | 3/2014 | Deskevich et al. | |
| 8,668,265 B2 | 3/2014 | Parker et al. | |
| 8,764,117 B2 | 7/2014 | van Hekken et al. | |
| 9,060,611 B2 * | 6/2015 | Grace | A47C 3/0255 |
| 9,107,503 B2 * | 8/2015 | Kline | A47C 7/008 |
| 2003/0164633 A1 * | 9/2003 | Jakus | A47C 9/002 |
| | | | 297/271.5 |
| 2003/0168901 A1 | 9/2003 | Wilkerson et al. | |
| 2006/0006715 A1 | 1/2006 | Chadwick et al. | |
| 2008/0290712 A1 | 11/2008 | Parker et al. | |
| 2014/0021752 A1 * | 1/2014 | von Letkemann | A47C 7/022 |
| | | | 297/195.11 |
| 2014/0339859 A1 * | 11/2014 | Holland | A47C 3/34 |
| | | | 297/19 |
| 2015/0265057 A1 * | 9/2015 | Atayan | A47C 7/008 |
| | | | 297/445.1 |

* cited by examiner

TRAINING DEVICE FOR A SEATING DEVICE AND METHOD OF USING THE SAME

CROSS-REFERENCE TO RELATED APPLICATIONS

This application claims priority to U.S. patent application Ser. No. 15/144,942 filed on May 3, 2016, which claims priority to U.S. Provisional Patent Application No. 62/162,163, which was filed on May 15, 2015. This application also claims priority to U.S. patent application Ser. No. 15/150,599 filed on May 10, 2016, which claims priority to U.S. Provisional Patent Application No. 62/162,163, U.S. Provisional Patent Application No. 62/166,938, which was filed on May 27, 2015, and U.S. Provisional Patent Application No. 62/167,443, which was filed on May 28, 2015. This application also claims priority to U.S. Provisional Patent Application No. 62/264,371, which was filed on Dec. 8, 2015.

FIELD OF INVENTION

The innovation relates to seating devices such as chairs and sit/stand stools and methods related to the use of seating devices.

BACKGROUND OF THE INVENTION

Chairs often include a base that supports a seat and/or a backrest. Examples of chairs, stools, and other types of seating devices and mechanisms utilized in seating devices may be appreciated from U.S. Pat. Nos. 8,764,117, 8,668,265, 8,663,514, 8,646,841, 8,480,171, 8,220,872, 8,216,416, 8,167,373, 8,157,329, 8,136,876, 8,029,060, 7,922,248, 7,887,131, 7,798,573, 7,478,878, 7,198,329, 6,997,511, 6,957,863, 6,880,886, 6,834,916, 6,824,218, 6,817,667, 5,997,087, 5,775,774, 5,683,139, 5,203,583, 5,112,103, 4,738,487, 4,652,050, 4,130,263, 3,312,437, and D664,779 and U.S. Pat. App. Pub. Nos. 2003/0168901, 2006/0006715, and 2008/0290712.

SUMMARY OF THE INVENTION

Embodiments of a seating device and embodiments of a method of using a seating device are provided. Embodiments of the seating device can include a seat, a base connected to the seat to tiltably support the seat on a floor and a training device configured to releasably connect to a floor engagement member of the base to tilt the base at a pre-selected angle. In some embodiments, the pre-selected angle can be within a range of 5°-35°, 5°-25°, or 5°-15° so that the base is tilted at the pre-selected angle relative to vertical.

Embodiments of the method of using a seating device can include the steps of attaching a training device to a floor engagement member of the seating device to tilt the base at a pre-selected angle and provide instructions on how to use the training device and/or remove the training device. Some embodiments of the method can also include the steps of using the seating device with the training device attached to the floor engagement member to learn how to use the seating device and removing the training device from the seating device. The using of the seating device can occur such that the seating device supports a weight from a user leaning on a seat of the sitting device or sitting on a seat of the sitting device during the use of the seating device. The training device may be removed after it is determined that the user has learned how to keep the user's balance while leaning or sitting on the seat of the seating device. The training device may be reusable so that the training device can also be reattached to the floor engagement member after the training device is removed to facilitate training of at least one other user.

In some embodiments, a seating device can include a seat, and a base connected to the seat to tiltably support the seat on a floor. The base may have a floor engagement member. A training device can be provided that is configured to releasably connect to the floor engagement member to tilt the base at a pre-selected angle. In some embodiments, the pre-selected angle is within a range of 5°-35°, 5°-40°, 5°-25°, or 5°-15°. For instance, the pre-selected angle can be 10°, 15°, 20 25°, or 30°.

In some embodiments, the training device can be structured to have a body that defines a slot that is sized and configured to receive a first side of the floor engagement member to tilt the base at a pre-selected angle. The first side of the floor engagement member can be a rear side of the floor engagement member or may be a front side of the floor engagement member. In some embodiments, the body can have a top portion, a bottom portion, and middle portion between the top and bottom portion that defines the slot. The bottom portion can be spaced apart from the top portion via the middle portion and extend outwardly past the top portion such that the bottom portion defines a floor of the slot and the top portion defines a ceiling of the slot.

The training device can be configured to be releasably connectable on a bottom of the floor engagement member adjacent a first side of the floor engagement member in some embodiments. For instance, at least one of the floor engagement member and the training device can be comprised of at least one magnetic element or at least one magnetic member to facilitate releasable connection between the bottom of the floor engagement member adjacent the first side of the floor engagement member and a top of the training device. In some embodiments, the training device has a body having a first end, a second end, and a middle portion between the first and second ends. A first magnetic element can be positioned adjacent the first end and a second magnetic element being positioned adjacent the second end. The floor engagement member can also be configured to have at least one magnetic member configured to magnetically attract at least one of the first magnetic element and the second magnetic element. For example, the floor engagement member can have a first magnetic member configured to magnetically attract the first magnetic element and a second magnetic member configured to magnetically attract the second magnetic element to releasably connect the bottom of the floor engagement member to the training device.

The training device can have a number of different structures or shapes. In some embodiments, the training device can have a body having a first end, a second end, and a middle portion between the first and second ends. A top of the body can be shaped such that the middle portion is at an apex of a curve defined by the top of the body to mate with a contour on the bottom of the floor engagement member.

Embodiments of the seating device can also include an instructional member wrapped about the floor engagement member. A portion of the instructional member can be positioned between the training device and the floor engagement member.

A method of using a seating device can include attaching a training device to a floor engagement member of the seating device to tilt the base at a pre-selected angle and providing instructions on how to use the training device and/or remove the training device. Embodiments of the method can also include the steps of using the seating device with the training device attached to the floor engagement member to learn how to use the seating device and removing the training device from the seating device. The using of the seating device can be performed such that the seating device supports a weight of a user leaning on a seat of the sitting device or sitting on the seat of the sitting device. The training device can be removed after it is determined that the user has learned how to avoid losing his or her balance while sitting or leaning on the seat of the seating device. The method can also include the steps of reattaching the training device to the floor engagement member after the training device is removed to facilitate training of at least one other user. The training device utilized in some embodiments of the method can include an embodiment of the training device disclosed herein.

Other details, objects, and advantages of the invention will become apparent as the following description of certain exemplary embodiments thereof and certain exemplary methods of practicing the same proceeds.

BRIEF DESCRIPTION OF THE DRAWINGS

Exemplary embodiments of a seating device and a training device that is connectable to the seating device are shown in the accompanying drawings and certain exemplary methods of making and practicing the same are also illustrated therein. It should be appreciated that like reference numbers used in the drawings may identify like components.

DETAILED DESCRIPTION OF EXEMPLARY EMBODIMENTS

Figure 1:
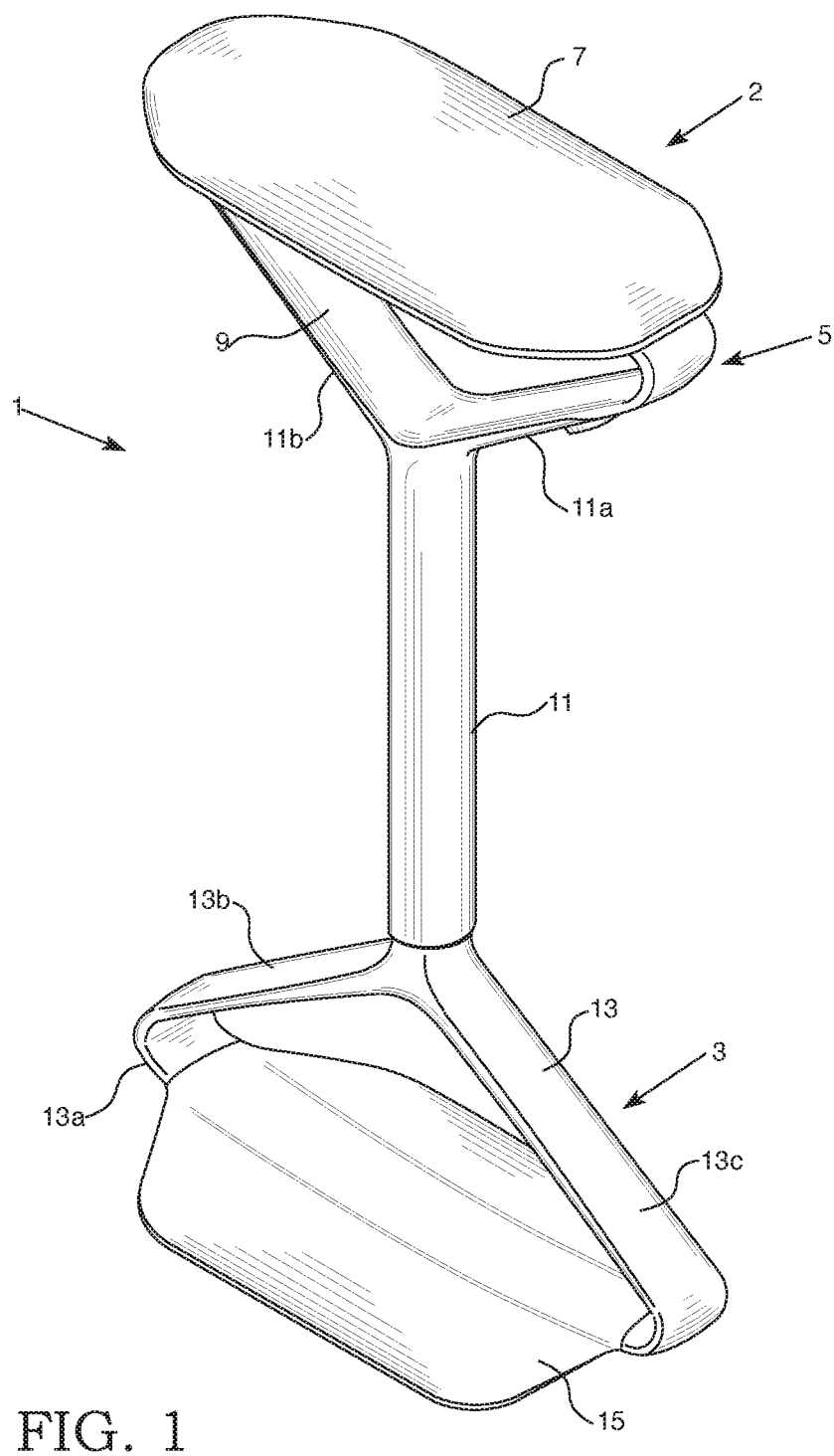
FIG. 1 is a perspective view of a first exemplary embodiment of a seating device.
Figure 2:
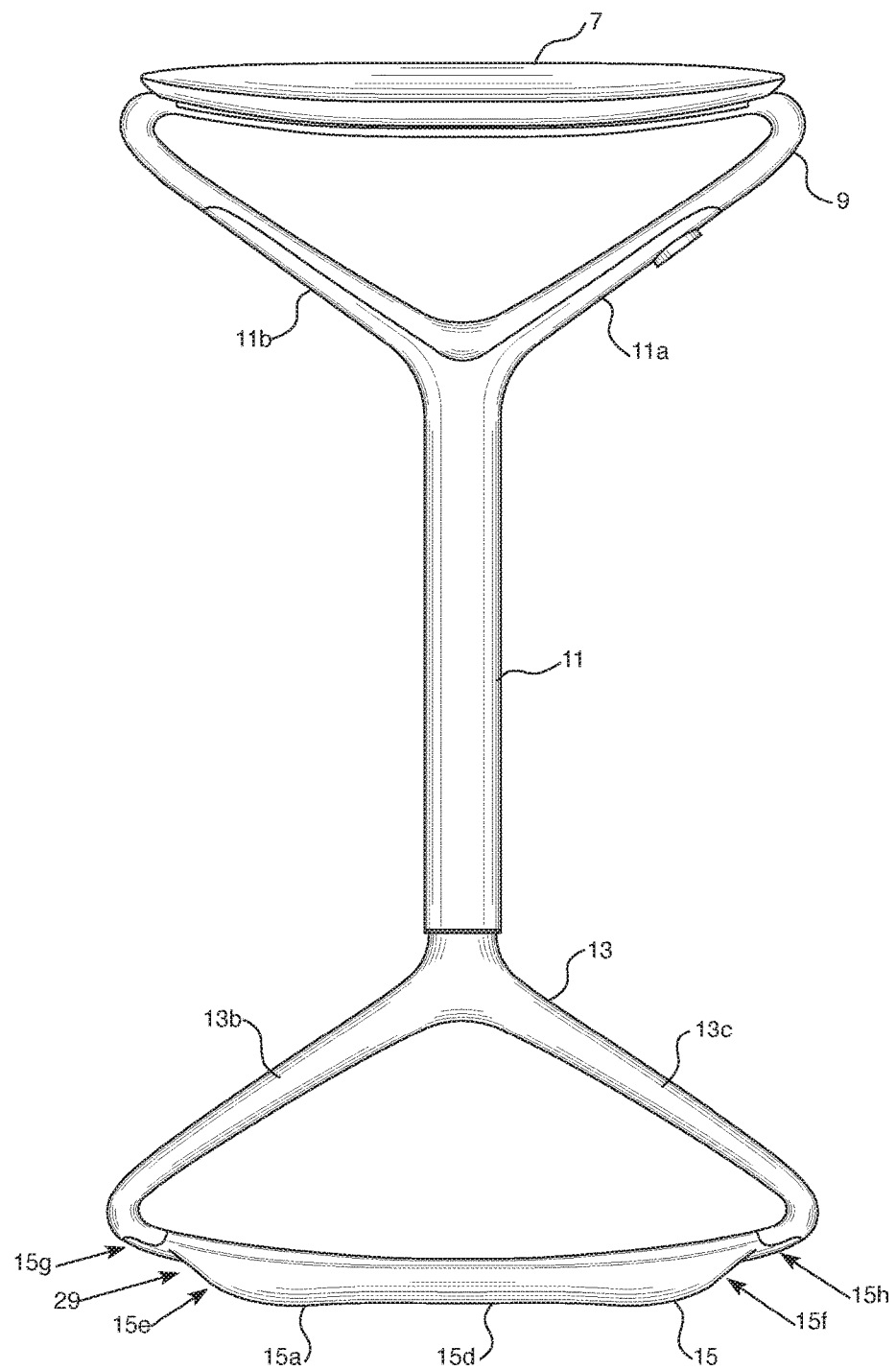
FIG. 2 is a side view of the first exemplary embodiment of the seating device.
Figure 3:
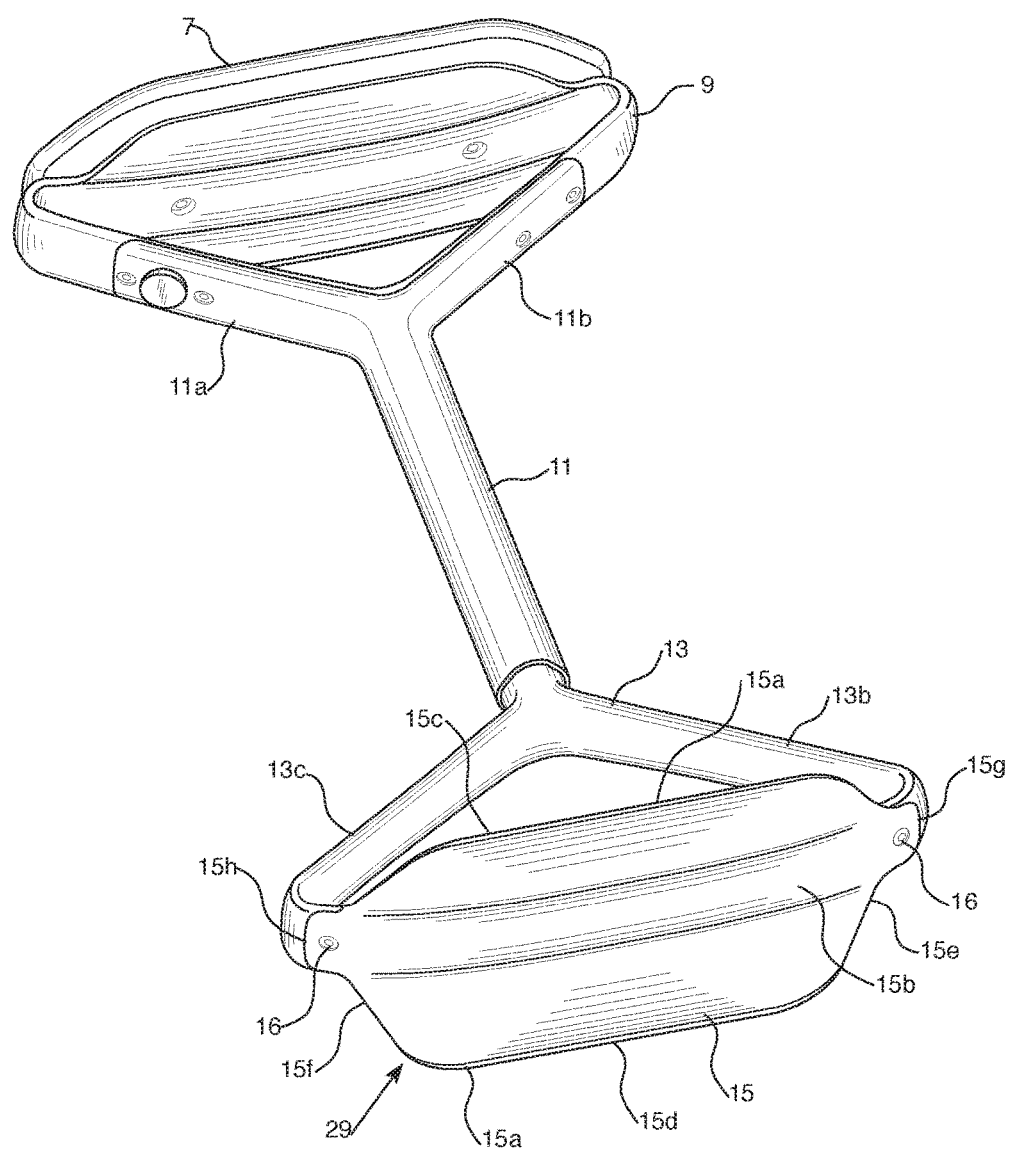
FIG. 3 is a bottom perspective view of the first exemplary embodiment of the seating device.
Figure 4:
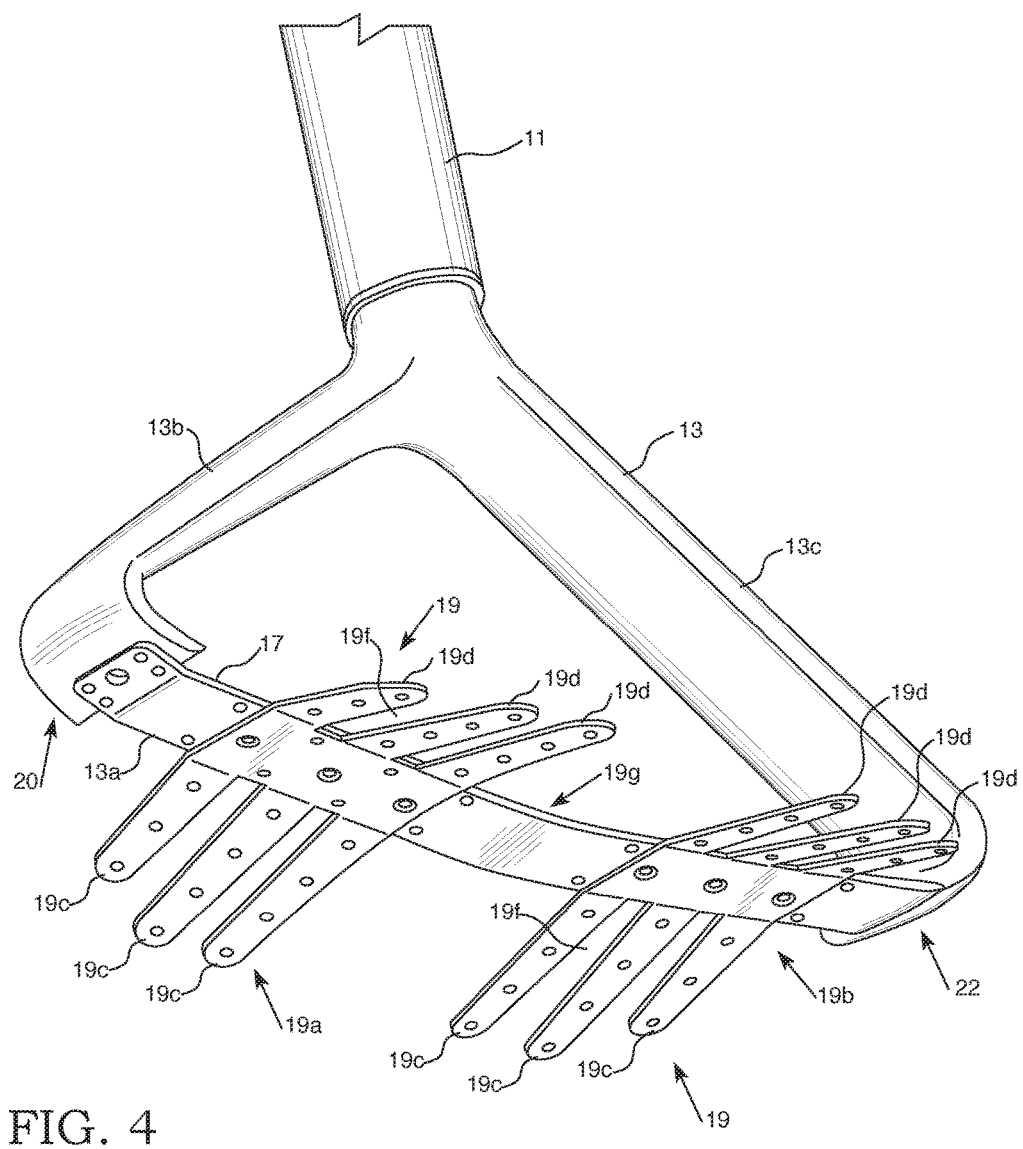
FIG. 4 is a fragmentary view of a bottom portion of the tilt mechanism of the first exemplary embodiment of the seating device. A floor contacting member 15 that covers resilient fingers 19 is cut away to illustrate the resilient fingers 19 of the bottom portion of the tilt mechanism.
Figure 5:
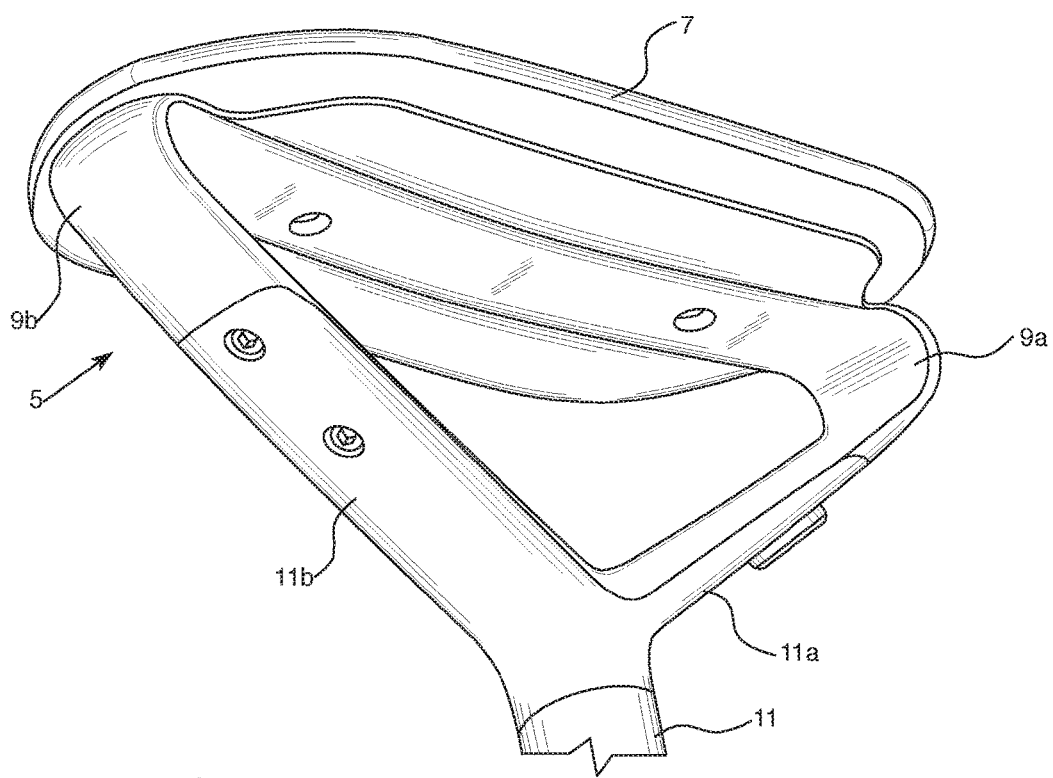
FIG. 5 is an enlarged perspective view of a top portion of the first exemplary embodiment of the seating device.
Figure 6:
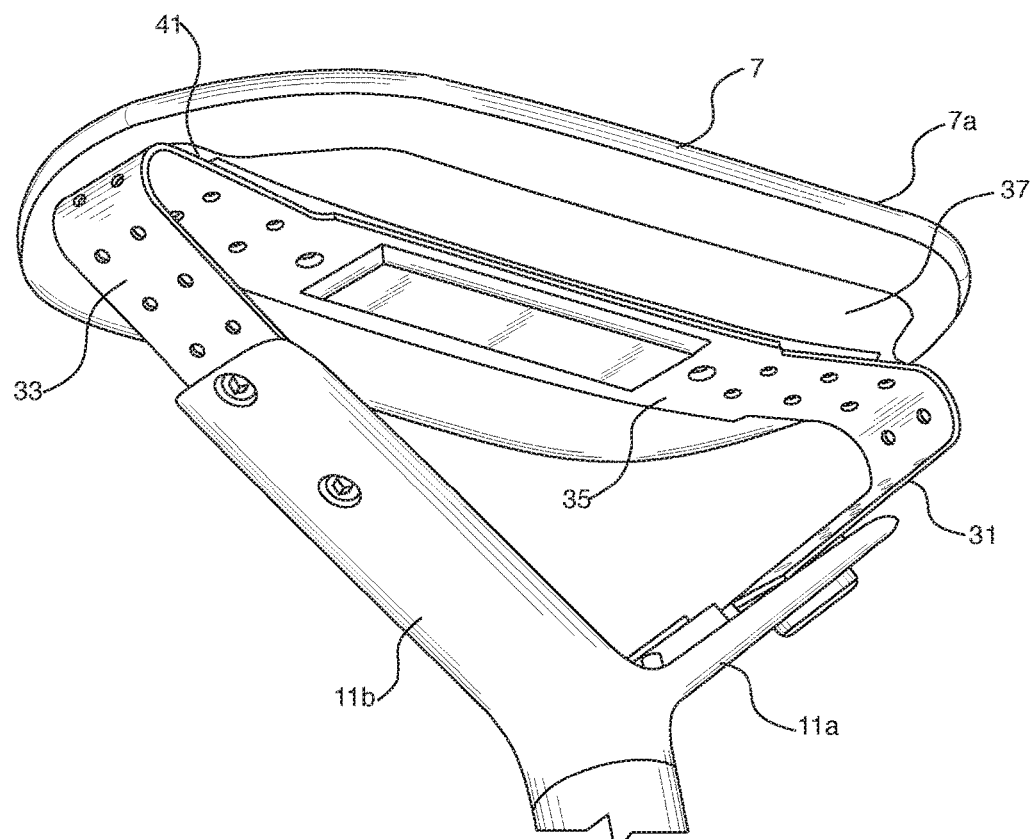
FIG. 6 is a perspective view of the top portion of the first exemplary embodiment of the seating device illustrated in FIG. 5 with an outer covering member of a component of the tilt mechanism is removed to illustrate other inner portions of that component.
Figure 7:
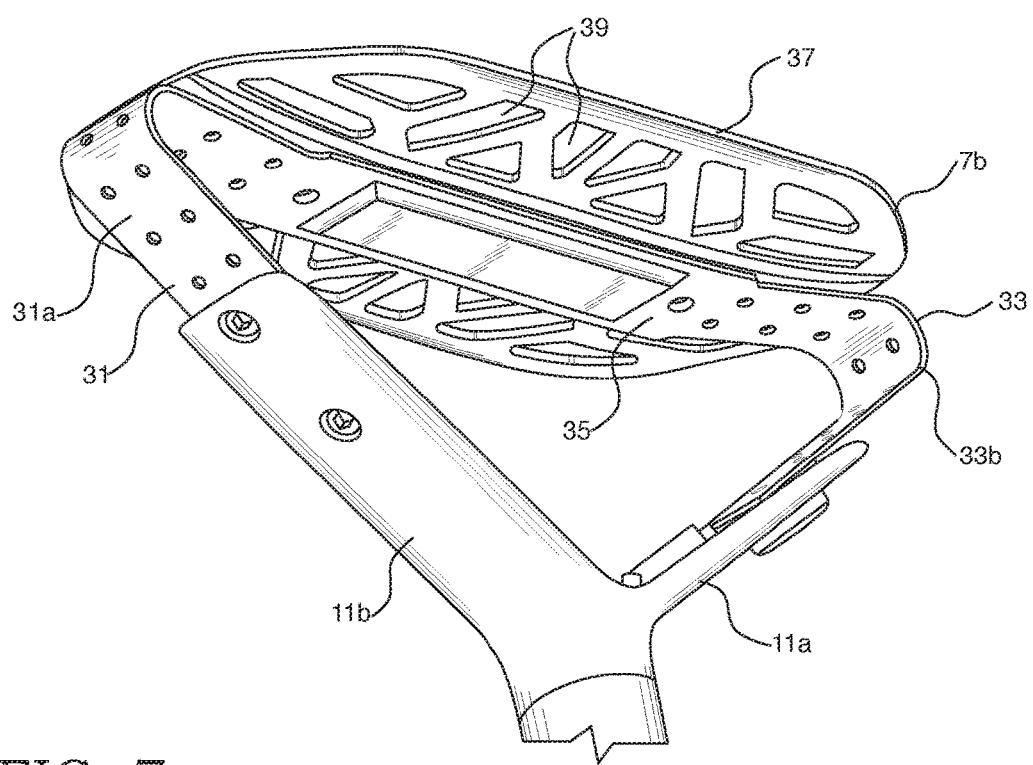
FIG. 7 is a perspective view of the top portion of the first exemplary embodiment of the seating device illustrated in FIG. 6 with a seating cushion element removed to better illustrate another portion of the seat that can provide support to the seating cushion element of the first exemplary embodiment of the seating device.
Figure 8:
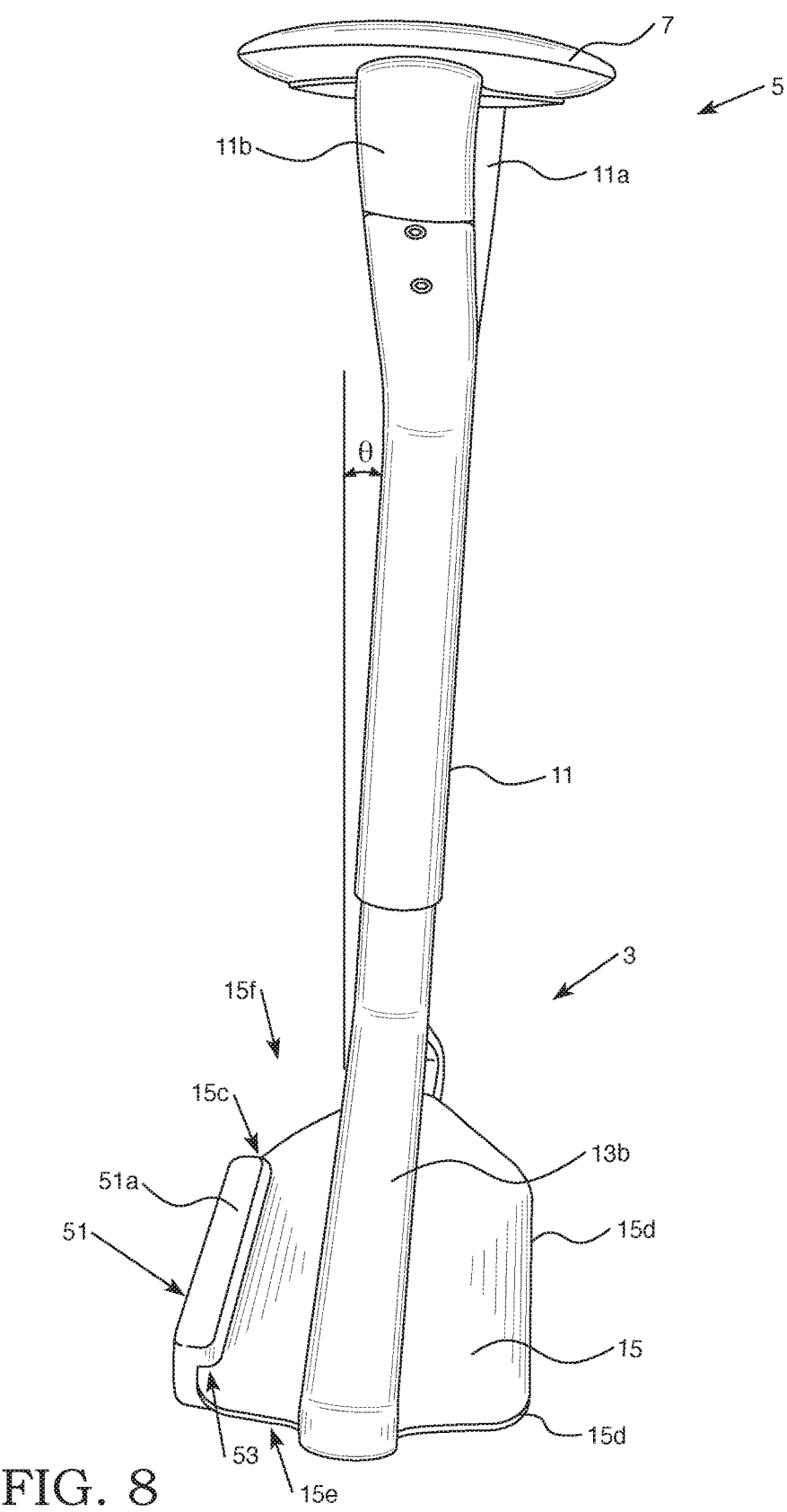
FIG. 8 is a perspective view of the first exemplary embodiment of the seating device connected to an exemplary embodiment of a releasably connectable training device.
Figure 9:
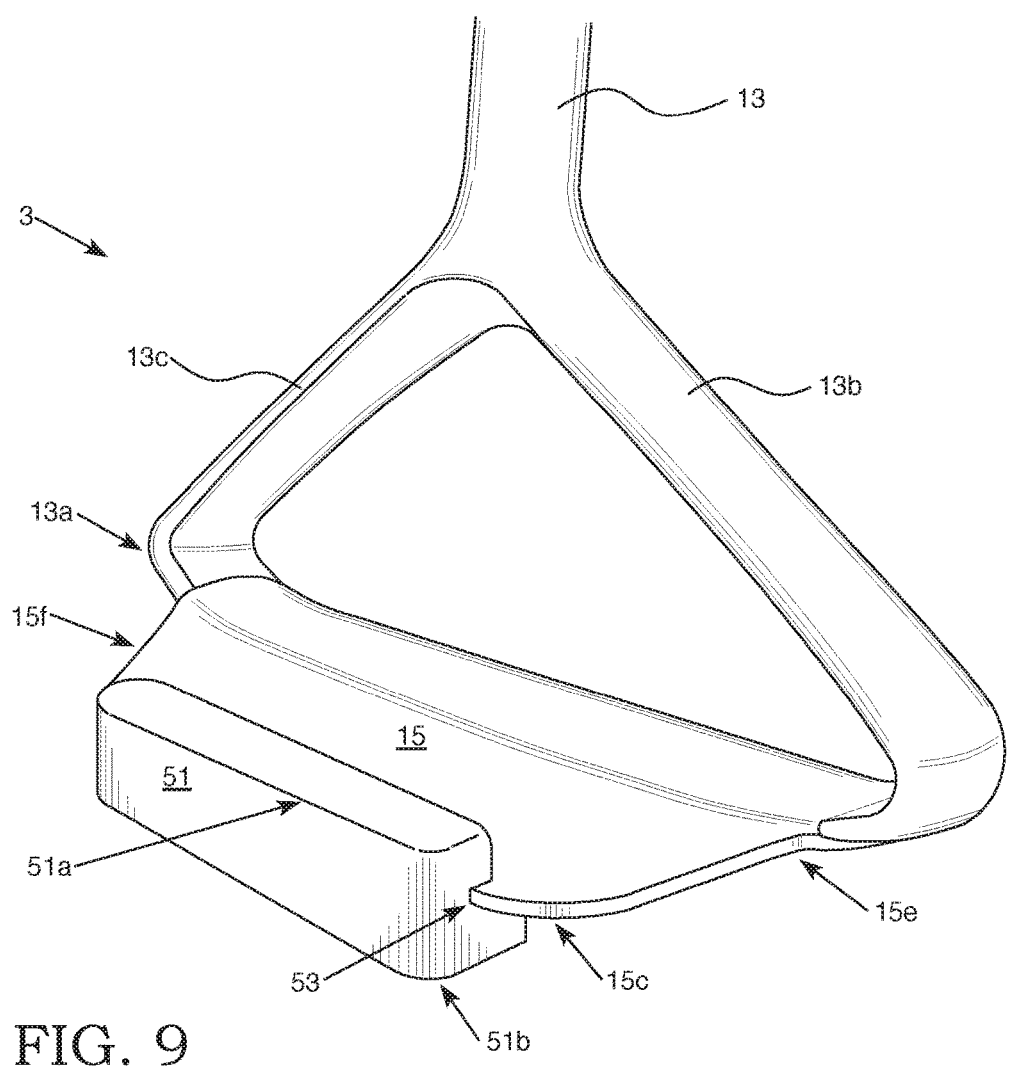
FIG. 9 is an enlarged fragmentary view of the first exemplary embodiment of the seating device connected to an exemplary embodiment of a releasably connectable training device shown in FIG. 8.
Figure 10:
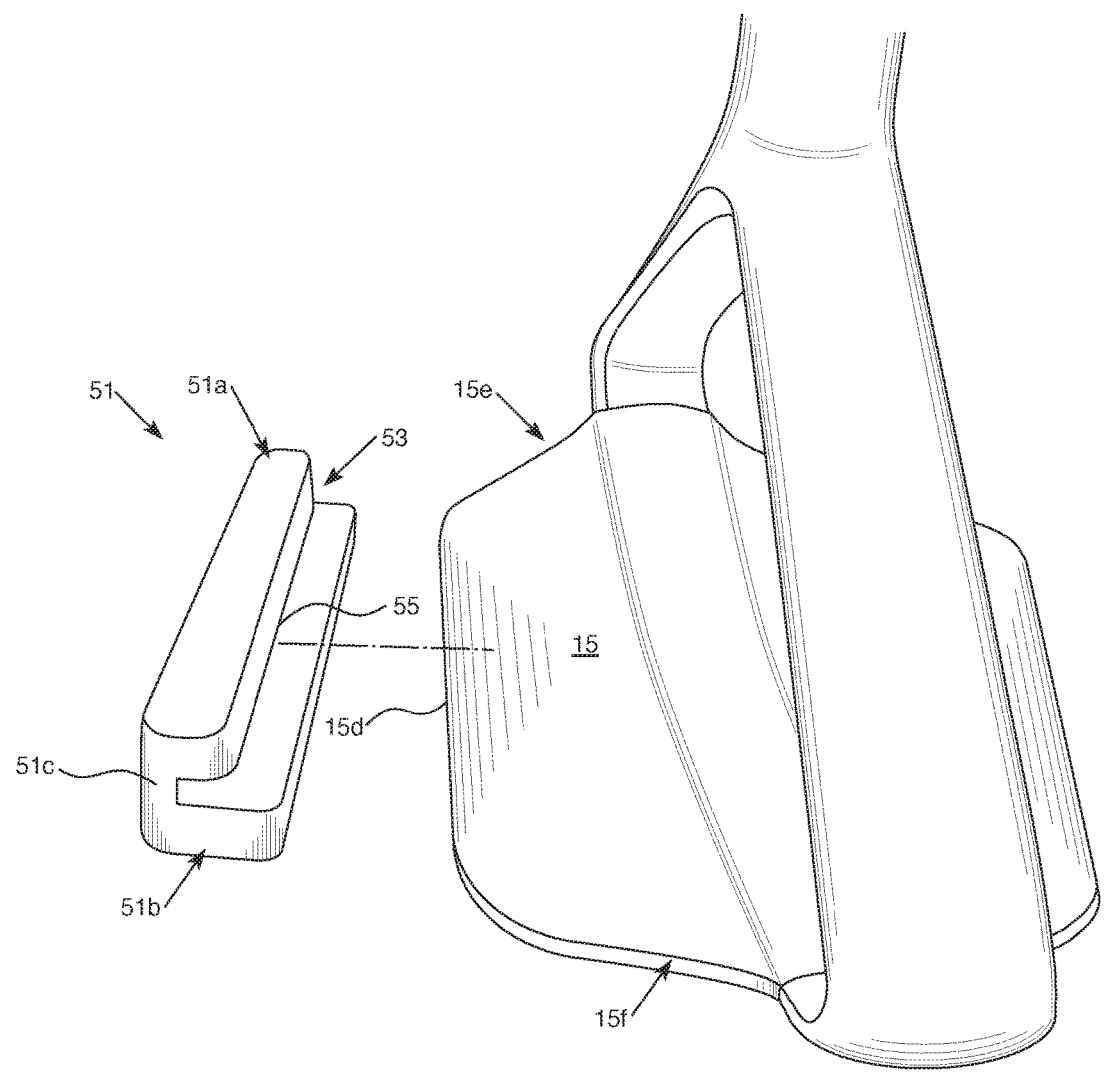
FIG. 10 is a fragmentary view similar to FIG. 9 illustrating the exemplary embodiment of the training device being decoupled from the base of the seating device.

Referring to FIGS. 1-18, an embodiment of a seating device 1 can be configured as a sit/stand stool. The seating device 1 may be configured as an embodiment of the seating device disclosed in U.S. Provisional Patent Application Nos. 62/162,163 and/or 62/167,443 and U.S. patent application Ser. No. 15/144,942 and U.S. patent application Ser. No. 15/150,599. The entirety of U.S. Provisional Patent Application No. 62/162,163 is incorporated herein by reference. The entirety of U.S. Provisional Patent Application No. 62/167,443 is incorporated herein by reference. The entirety of U.S. patent application Ser. No. 15/150,599 is incorporated herein by reference. The entirety of U.S. patent application Ser. No. 15/144,942 is incorporated herein by reference.

Referring to FIGS. 1-18, an embodiment of a seating device 1 can be configured as a sit/stand stool. The seating device 1 can include a seat assembly 2 that is supported on a base 3. The seat assembly 2 can be attached to the base via a seat frame 5. In some embodiments, the seat frame 5 can include at least a portion of a tilt mechanism that can be configured to control how the seat 7 of the seating device may be tilted about one or more axes by a user sitting or leaning on the seat 7. The tilt mechanism can include a floor engagement member 15 that is connected to the base 3. In some embodiments, the base 3 can also include a portion of the tilt mechanism that is configured to allow the user to effect tilting of the seat 7 about at least one axis. In some embodiments, the tilting mechanism can be configured so that the tilting is provided via deformation of one or more elastomeric elements such that the tilting is about one or more axes, but that those axes are generally defined by each member being deformed by a force provided by a user instead of being defined by a non-deformable element such as a rigid axle or pivot pin. Other embodiments may be configured to include a combination of non-deformable elements that are configured to provide an axis of rotation for a seating device component in addition to deformable elements.

The floor engagement member 15 can be attached to the bottom of a base member 13. The base member 13 may be a triangularly shaped structure having a first generally horizontal member 13a connected to elongated inclined members 13b and 13c that are attached to the opposite first and second ends of the generally horizontal member 13a. For example, a first inclined member 13b can have its first end connected to a first end of the generally horizontal member 13a and have it second end attached to the second end of the second elongated inclined member 13c. The first end of the second inclined member 13c can be attached to the second end of the generally horizontal member 13a. In some embodiments, the base member 13 may be integrally cast or molded to form the base member. In other embodiments, the base member may have the generally horizontal member fastened or otherwise attached to the elongated inclined members 13b and 13c.

At least one vertical post or other type of vertical member 11 of the base 3 can extend vertically from adjacent its first end that is connected to the upper second ends of the first and second inclined members 13b and 13c to its upper second end. The upper second end of the vertical member 11 can be connected to multiple inclined arms such as a first inclined arm 11a and a second inclined arm 11b. Each inclined arm can extend upwardly and sidewardly away from the upper end of the vertical member 11. The inclined arms 11a and 11b can be configured for connection to the seat 7 so that that the base 3 can support the seat 7.

For instance, each of the upper inclined arms 11a and 11b may have its first end attached to the upper end of the vertical member 11 and have its second end positioned higher and outwardly relative to the upper end of the vertical member. The second end of the first inclined arm 11a may be positioned adjacent to and below a first side of the seat and the second end of the second inclined arm 11b may be positioned adjacent to and below a second side of the seat that is opposite the first side of the seat 7.

In some embodiments, the upper first and second inclined arms 11a and 11b may be integral with the vertical member 11 via casting or injection molding or may be otherwise attached to the vertical member 11. For instance, in some embodiments, the base 3 may be structure such that the base member 13, vertical member 11, and the first and second inclined arms 11a and 11b are a unitary structure that is cast or molded as an integral structure. As another example, the vertical member 11 may be attached to the base member 13 and may be integral with the first and second inclined arms 11a and 11b via casting, welding, or molding in other embodiments. In such embodiments, the vertical member 11 may be coupled to an upper end portion of the base member 13 or other portion of the base member 13 so that the vertical member is vertically moveable relative to a portion of the base member 13. In yet other embodiments, each arm may be fastened or otherwise attached to the vertical member 11.

The tilting mechanism of the seating device can include at least one tilt mechanism component attached to the base 3 and at least one tilt mechanism component attached between the seat 7 and the base 3. For instance, the tilt mechanism can include at least one deformable element connected to the base 3. For example, as may be appreciated from FIG. 4, the floor engagement member 15 can be configured to cover a plurality of spaced apart deformable fingers 19 that extend forwardly and rearwardly from the generally horizontal member 13a of the base member 13. The fingers 19 can include a first set of fingers 19a and a second set of fingers 19b. Each set of fingers can include forwardly extending fingers 19c and rearwardly extending FIG. 19d. The rearwardly extending fingers may extend away from the generally horizontal member 13a rearwardly and the forwardly extending fingers may extend away from the generally horizontal member 13a forwardly (e.g. in a direction that is opposite the direction at which the rearwardly extending fingers extend). The fingers 19 may be positioned between a first side 20 and a second side 22 of the base 3 (e.g. left and right sides of the base or right and left sides of the base).

The first and second set of fingers 19a and 19b can be positioned so that each of the rearwardly extending fingers 19d in a set of fingers is spaced apart from an immediately adjacent other rearwardly extending finger in that set by a gap 19f. The frontwardly extending fingers 19c in each set fingers can also be spaced apart from immediately adjacent other frontwardly extending fingers of the set by a gap 19f. Each set of fingers may be separated from each other by a space 19g. For instance, the first set of fingers 19a (e.g. the frontwardly extending and rearwardly extending fingers of the first set of fingers 19a) can be attached to the generally horizontal member 13a of the base member 13 adjacent the first side 20 of the base 3 and the second set of fingers 19b (e.g. the frontwardly extending and rearwardly extending fingers of the second set of fingers 19b) can be attached to the generally horizontal member 13a adjacent to the second side 22 of the base member 13. The first and second sets of fingers 19a and 19b can be positioned so that the space 19g between the first and second sets of fingers 19a and 19b can be in the central portion or middle portion of the generally horizontal member 13a. No fingers 19 may be attached on the generally horizontal member 13a within the space 19g.

Each finger 19 can be composed of spring steel, an elastomeric material, or other type of deformable material. A proximate end of each finger may be attached to the generally horizontal member 13a and a distal end of each finger may be located forward or rearward of the seat 7 and/or positioned to be below the front side of the seat or rear side of the seat at a location below the seat. Each finger's distal end may be configured to engage the floor to provide support to the base and permit the base to be tilted about at least one axis defined by the one or more points at which the finger may deform as it engages a floor and deforms in response to a force provided by a seated user that is sitting on the seat 7 and/or is leaning on the seat 7.

For example, a user may sit on the seat 7 and have his or her legs extend to the floor from the front side of the seat 7. The user may manipulate his or her legs by bending the user's knees to rock or bounce the seat 7 back and forth forwardly and backwardly, rock back and forth from a less forwardly to a more forwardly position, or rock back and forth from a vertically straight position to a forwardly leaning position. In response to the force of the user provided via the user's bending knees to initiate a forward lean while sitting on the seat 7 or leaning on the seat 7, the forwardly extending fingers 19c may deform from a first state to a second deformed state in which the fingers are more curved and/or compressed when in the second state. At the same time, the forward leaning provided by the user may result in the rearward fingers 19d adjusting from a first compressed state to a second less compressed state in which the rearwardly extending fingers 19d are less deformed, less curved, or less flexed. In response to the user's knees straightening from a bent position, the forwardly leaning fingers 19c may become less deformed and adjust from their second deformed state back to their first deformed state while the rearwardly extending fingers may become more deformed (and more compressed) and compress from the second compressed state back to their first compressed state.

The spacing and arrangement of the fingers 19 can also be configured to contribute to providing increased support when a user may provide a side-to-side or lateral force, such as swiveling in the user's seat. The deformability of the fingers in addition to the spacing and extent to which the fingers 19 extend can also facilitate such support so that the base may support a wide range of user motion.

The floor engagement member 15 may be structured to entirely cover the fingers 19. The floor engagement member may be composed of an elastomeric material, a polymeric material, a composite material, or other type of material. The floor engagement member 15 may have a bottom that has an outer surface that is composed of a material and/or is structured via ribbing, spaced apart beads, recesses, grooves and/or other projections and recesses to induce friction when the member is flexed, deformed, or otherwise moved along a floor surface or placed into contact with the floor surface. The structure of the floor engagement member 15 can also be configured to facilitate such flexing or deformation. For instance, the floor engagement member 15 can be structured so that a bottom of the floor engagement member is concave in shape (e.g. is bowed in shape or has an inner, central region that is raised relative to an outer peripheral portion, etc.) such that a peripheral bottom edge of the floor engagement member is in contact with the floor and a central portion of the bottom of the floor engagement member 15 can be flexed so that at least some of this portion is in contact with the floor in response to at least one force that may be provided by a user who is sitting or leaning on the seat 7. In at least some embodiments, the deformation or flexing of the floor engagement member 15 may be configured to occur at the same time as the deformation or flexing of the fingers 19 that are entirely enclosed within an inner cavity of the floor engagement member 15 such that the fingers flex or deform in engagement with the floor and in response to at least one user provided force while the floor engagement member 15 is also deformed or flexed in response to that user provided force for contact with the floor.

The floor engagement member 15 can be configured to spread out the force provided by the fingers 19 over a larger area to provide increased stability. Further, the floor engagement member 15 can also provide deformation or flexure in response to user force that works in conjunction with the flexure of the fingers 19 to provide a degree of freedom of motion for a user sitting or leaning on the seat 7. The floor engagement member 15 can also be configured so that the floor engagement member 15, by directly contacting the floor while the enclosed fingers engage the floor via the floor engagement member 15 that encloses the fingers 19, provides a desired amount of induced friction upon motion along a floor via the flexing of that member. The friction inducing feature of the floor engagement member 15 can help improve the stability of the base 3 and help keep the seating device 1 upright throughout a relatively large range of motion that may be induced by one or more forces provided by a user sitting on the seat 7 or leaning on the seat 7 as compared to having the fingers 19 directly contact the floor.

In some embodiments, the floor engagement member 15 may be composed of rubber, synthetic rubber, or other type of elastomeric material and have a tread defined on at least the bottom surface of the floor engagement member 15. In some embodiments, the floor engagement member may be composed of a thermoplastic elastomer (TPE) such as a thermoplastic polyester elastomer, a thermoplastic copolyester elastomer (TPC-ET), a polyether-ester block copolymer, styrenic block copolymers (TPE-s), a polyolefin blend (TPE-o), elastomeric alloy (TPE-v or TPV), a thermoplastic polyurethane (TPU), a thermoplastic copolyester, or a thermoplastic polyamide or may be composed of another type of material such as synthetic rubber, natural rubber, a thermoset elastomeric material, a cast urethane material, a polyurethane elastomeric material, a thermoset polyurethane material, a thermoset urethane material, or other type of elastomeric material or a type of polymeric material.

The floor engagement member 15 can be positioned to enclose a substantial portion (e.g. over 70% of the length of the generally horizontal member 13a, over 80% of the length of the generally horizontal member, over 90% of the length of the generally horizontal member, etc.) of the generally horizontal member 13a to which the fingers 19 are attached. For instance, the floor engagement member 15 may cover a portion of the length of the generally horizontal member that extends from adjacent to where the generally horizontal member 13a is attached to the first inclined member 13b to a position adjacent to where the generally horizontal member 13a is attached to the second inclined member 13c.

In some embodiments, the floor engagement member 15 may be attached to the base member 13 by having the generally horizontal member 13a to which the fingers 19 are attached passed through the inner cavity of the floor engagement member 15 so that the floor engagement member 15 encloses a portion of the generally horizontal member 13a positioned in its inner cavity and all of the fingers 19. Thereafter, fasteners 16 may be passed through the bottom of the floor engagement member 15 and into the bottom of the generally horizontal member 13a. For instance, a fastener may be positioned adjacent the first side 20 of the base member 13 and a fastener 16 can be positioned adjacent the second side 22 of the base member for facilitating the attachment of the floor engagement member 15 to the generally horizontal member 13a of the base member 13. In addition, or as an alternative, welding, adhesive, or other fastening mechanisms may also be utilized to help affix the floor engagement member 15 to the generally horizontal member 13a of the base member 13. After the floor engagement member 15 is attached to the generally horizontal member 13a to enclose the fingers and a portion of the generally horizontal member, the generally horizontal member 13a may be attached to each of the first and second inclined members 13b and 13c. via at least one fastener, welding, interlocking profiles, and/or at least one other fastening mechanism.

In some embodiments, it is contemplated the seating device 1 may be configured so that there are no fingers 19 within the floor engagement member 15. For such an embodiment, the floor engagement member 15 may be configured to provide flexing, deformation, and resiliency for supporting a user leaning or sitting on the seat 7 as the user may provide a force for rocking, tilting, or otherwise moving the seat 7 while the user sits or leans on the seat 7 such that the seat 7 is rockable or otherwise tiltable about at least one axis via the flexing of the floor engagement member 15. Such an embodiment may utilize the floor engagement member 15 such that no fingers are included in the seating device 1. For such embodiments, the central portion of the floor engagement member 15 may have an inner channel that receives a substantial portion of the length of the generally horizontal member 13a of the base member 13 and may be fastened to that member. The floor engagement member 15 can be so attached such that the bottom of the floor engagement member 15 can have a concave shape 29 such that an outer peripheral portion 15a of the bottom is in contact with a floor and an inner central region 15b of the floor engagement member 15 is raised relative to the lower outer peripheral portion. The outer peripheral portion 15a can be configured so that front and rear sides 15c and 15d of the outer peripheral portion contact a floor while the left and right sides 15e and 15f of the floor engagement member 15 are structured to extend upwardly from the front and rear sides 15c to middle portion 15g of the left side and a middle portion 15h of the right side and do not contact the floor.

During flexing of the floor engagement member 15, the central portion and the outer peripheral portion may be flexed in response to at least one user provided force to permit tilting of the seat 7 about at least one axis. Due to such flexing, at least a portion of the inner central region may be flexed sufficiently to also contact the floor. Upper portions of the left and/or right sides 15e and 15f may also be moved due to such flexing into contact with the floor. The bottom portion of the floor engagement member 15 may include at least one tread or other type of profile (e.g. recesses, protuberances, bumps, grooves, a combination thereof, etc.) to help improve stability of the support provided by the base 3 and the floor engagement member 15 by helping to induce a relatively high amount of friction when moving along a floor (e.g. a flooring surface, etc.) when the floor engagement member 15 is flexed or deformed due to one or more forces provided by a user sitting or leaning on the seat 7.

The tilt mechanism of the seating device 1 can also include a component that is configured to connect the seat 7 to the base 3 to provide for tilting of the seat 7 about at least one axis of rotation that is defined by at least one member that may flex or be deformed in response to force provided by a user sitting or leaning on the seat 7. For example, at least one seat connecting member 9 can be connected between the seat 7 and the upper portion of the base 3. For example, a first deformable member 9a and a second deformable member 9b can be positioned to extend from underneath opposite sides of the seat 7 to the upper portion of the base 13. For instance, the first deformable member 9a may extend from adjacent a first side of the seat to an upper portion of the base and the second deformable member 9b may extend from a second side of the seat to an upper portion of the base. Each deformable member's lower end may be positioned below and inward relative to its upper end. Each deformable member may be composed of a polymeric material, a resilient material, a flexible or resilient metal such as spring steel, or an elastomeric material.

In some embodiments, the first and second deformable members 9a and 9b may be separate members that are each fastened to the seat 7. In other embodiments, the first and second deformable members 9a and 9b may be portions of a unitary structure. For instance, the first and second deformable members may be declinedly extending members that extend downwardly and inwardly from adjacent opposite sides of the seat 7 and may be opposite side portions of an annular triangularly shaped deformable seat connecting member 9 that connects the seat 7 to the first and second inclined arms 11a and 11b of the base 3. Such a seat connecting member 9 may be formed as an integral one piece body defining a central triangular shaped opening via casting or molding and may be composed of an elastomeric material such as, for example, a synthetic rubber, a natural rubber, a thermoplastic elastomer (TPE) such as a thermoplastic polyester elastomer, a thermoplastic copolyester elastomer (TPC-ET), a polyether-ester block copolymer, styrenic block copolymers (TPE-s), a polyolefin blend (TPE-o), elastomeric alloy (TPE-v or TPV), a thermoplastic polyurethane (TPU), a thermoplastic copolyester, or a thermoplastic polyamide or the seat connecting member 9 may be composed of another type of material such as synthetic rubber, natural rubber, a thermoset elastomeric material, a cast urethane material, a polyurethane elastomeric material, a thermoset polyurethane material, a thermoset urethane material, or other type of elastomeric material or a type of polymeric material. In yet other embodiments, it is contemplated that the seat connecting member 9 can be composed of a spring steel or other type of flexible, resilient material.

In some embodiments, each seat connecting member 9 may include an inner core element that is enclosed within a covering material that is over-molded to the inner core and/or otherwise attached to that inner core element. The core element may be composed of a different material than the covering or may be composed of the same material of the covering but have a different shape to facilitate a contribution to the overall resiliency, deformability and/or flexibility of the formed member that differs from the contribution the covering may make to such properties of the member. For instance, as can be seen from FIGS. 6-7, the seat connecting member 9 can be structured to include at least one inner element that is enclosed or entirely enclosed by an elastomeric or polymeric covering that may be over-molded or otherwise attached to each inner element. For instance, each seat connecting member 9 (e.g. a unitary seat connecting member 9 or separate deformable members 9a and 9b that may extend downwardly from the seat 7 to an upper portion of the base) may have an inner element that is composed of a metal, polymeric material, or elastomeric material that is covered by a covering. The inner element and covering may each contribute to the flexibility, deformability, and/or resiliency of the seat connecting member 9.

For example, the first deformable member 9a may include a covering that is over-molded to a first inner element 31 and the second deformable member 9b can include a covering that is over-molded to a second inner element 33b. A seat connecting inner element 35 can be positioned between the first and second inner elements 31a and 33b and be positioned for attachment to the bottom of the seat 7. In some embodiments, the seat connecting inner element 35 can be positioned to extend along a substantial portion of the length of the seat 7 along the underside of the seat 7 between the first and second inner elements 31a and 33b or can be configured to extend along the entire length of the seat 7 along the underside of the seat 7.

In some embodiments, the first and second deformable members 9a and 9b may not be connected to the seat connecting inner element 35 and may, instead have their upper ends fastened or otherwise attached to the bottom of the seat 7 to a respective side portion of the seat. In other embodiments, the first and second deformable members 9a and 9b may be part of a unitary seat connecting member 9 that is formed by having an integral inner element having first, second and third portions that are structured as first and second downwardly extending first and second inner elements 31a and 33b that extend downwardly form opposite sides of a central seat connecting inner element 35. The unitary inner element structure may be cast or molded as a one piece structure that is subsequently over-molded or otherwise attached to a one piece molded or one-piece casting covering the encloses the unitary inner element. In some embodiments, the covering may completely enclose that unitary inner element. In other embodiments, the covering may completely enclose the first and second inner elements 31a and 33b and may cover a bottom portion of the seat connecting inner element 35 that is positioned for attachment to the bottom of the seat 7.

The first and second deformable members 9a and 9b can be configured to flex and/or deform about at least one axis in response to a force provided by a user sitting or leaning on the seat. For instance, each deformable member may rotate about a first axis of rotation in response to a user leaning forwardly or rearwardly on the seat and may also twist or otherwise rotate about a second axis when deforming or flexing in response to such leaning. The deformability and/or flexing provided by each seat connecting member 9 can be configured so that the seat 7 is tiltable about multiple axes that are not pre-defined by a hard axle, but instead are moveably defined by the deformability or resilient of the member. This freedom of movement, in combination with the similar undefined axis of rotation tiltability provided by the fingers 19 and/or floor engagement member 15 can provide an improved freedom of movement for a user sitting or leaning on the seat 7.

Additional flexibility and further improved freedom of movement for a seated user can also be provided by a structure of the seat 7. For instance, the seat 7 can include a covering 7a that may be, for example, a polymeric seat structure such as a type of saddle seat or other type of seat structure or may be fabric covered upholstered body structure (e.g. a covered cushion, etc.), That covering element may be attached to a seat core member 7b or other portion of a seat frame 5, For instance, the covering 7a may be attached to a seat core member 7b that is configured so that the covering 7a rests on the core member 7b so that the core member 7b can contribute to the cushioning effect provided by the covering 7a of the seat 7. The core member 7b can also be configured to facilitate attachment of the seat 7 to each seat connecting member 9.

The core member 7b can be positioned under the covering 7a or may be positioned at least partially within the covering 7a (e.g. entirely within the covering 7a or partially within the covering 7a with a portion of the core element uncovered via an opening 41 defined in the bottom of the covering 7a. The core member 7b can be a unitary core member 37 that has holes 39 formed therein. The holes 39 can be shaped to help define how the core member may flex or deform in response to weight or other force a user may apply on the core member via leaning or sitting on the seat 7. A central portion of the core member 7b can be configured for attachment to the seat connecting inner element 35. The entire length of the central portion of the core member 7b can be defined to receiving the seat connecting inner element 35 and having one or more fasteners passed through the core member 7b for attachment of the seat connecting inner element 35 to the core member 7b. Adhesive, welding, or other type of fastening mechanism can also be used, or be used as an alternative to or in addition to fasteners for such attachment as well.

The core member 7b can be sized and shaped for being positioned within an inner cavity defined in the covering 7a for connection of the core member 7b to the covering 7a for forming the seat 7. For instance, the core member 7b may be passed through a bottom opening 41 for positioning within an inner cavity defined in the covering 7a for receiving the core member 7b. The covering 7a may be positioned on the core member via the bottom opening 41 after the core member 7b is attached to the seat connecting member 9 (e.g. fastened to the seat connecting inner element 35 and/or attached to an upper end portion of each of the first and second deformable members 9a and 9b).

The core member 7b can be configured to contribute to the flexibility and deformability of the seat 7. For instance, the covering 7a may be configured to provide a level of comfort to a user while the core member 7b may contribute to such comfort by providing flexure and deformation via the material property of the material of the core member and the holes 39 formed in the core member. The core member 7b may also permit the seat to tilt via deformation of portions of the core member 7b and/or twisting or other type of tilting of the core member 7b about its connection to at least one seat connecting member 9. The flexure and/or resiliency provided by the core member 7b can further contribute to the freedom of motion that may be provided to a user by the seating device 1 and the tilt mechanism of the seating device.

Referring to FIGS. 8-18, a training device 51 can be removably connectable to the base 3 of the seating device 1 to help train a user on how to stably sit and/or stand while having their buttocks contacting the seat 7 of the seat assembly 2. The training device 51 can be configured to provide a forward tilt of a pre-selected angle θ relative to vertical when it is connected to a rear side 15d of the floor engagement member 15 and can be configured to provide a rearward tilt of the pre-selected angle θ relative to vertical when it is connected to the front side 15c of the floor engagement member 15. In some embodiments, the pre-selected angle θ may be within a range of 5°-30° (e.g. be 5°, 10°, 15°, 20°, 25° or 30°) and more preferably within a range of 5°-15°. In other embodiments, it is contemplated that the pre-selected angle may be another angle outside of this range (e.g. 4° or 35°).

The training device 51 can be structured as a body that is configured to be attached adjacent to a front or rear side 15c or 15d of the floor engagement member 15. For instance, the training device 51 can be configured to have an upper portion 51a that is attached to a bottom portion 51b to define a slot 53 that is configured to releasably receive a front side 15c or rear side 15d of the floor engagement member 15 for connection to that member to be connected to the front side 15c or rear side 15d of the floor engagement member 15. In other embodiments, the training device may be configured to be attached to a bottom portion of the floor engagement member adjacent to the front side 15c or the rear side 15d of the floor engagement member 15.

In embodiments in which the training device includes a body having top and bottom portions 51a and 51b that define a slot 53 for receiving the front side 15c and/or rear side 15d of the floor engagement member 15, the top portion 51a may be structure to be integral with the bottom portion 51b. When the training device receives a front or rear side of the floor engagement member 15, the top portion 51a may be located above the floor engagement member 15 and the bottom portion may be located below the floor engagement member 15. A bottom of the bottom portion 51b may contact the floor when attached to the front or rear side of the floor engagement member 15 via slot 53. The bottom portion 51b of the training device may be spaced apart from the top portion 51a via a middle portion 51c that is between the top and bottom portions 51a and 51b. The bottom portion 51b may extend outwardly from a bottom of the middle portion 51c to a location that is past the outermost end of top portion 51a for defining the slot 53 to define a floor of the slot that extends beyond the roof of the slot defined by the top portion 51a to provide further support to the bottom of the floor engagement member 15 when the floor engagement member 15 is coupled to the training device 51 via the slot 53. The top portion 51a may extend from a top part of the middle portion 51c to define a roof of the slot 53 or the top of the slot 53. The slot may be configured as an elongated opening, an elongated channel, or other type of elongated aperture that has a mouth 55 that is shaped to allow a part of the floor engagement member 15 to pass into the slot 53 for being received and held therein. The floor engagement member 15 may be held within the slot 53 via friction or an interference fit the floor engagement member 15 may have by contacting the portion of the device 51 that define the slot (e.g. sections of the top portion 51a, middle portion 51c, and bottom portion 51b that define the slot 53) when a portion of the floor engagement member 15 is positioned within the slot 53.

The body of the training device may be structured to have a pre-selected weight and to have an outer surface that is configured to induce friction with the floor to help stably support the seat 7 at a tilted position that is angled θ relative to vertical to provide a forward or rearward tilt to the seat 7. The tilting of the seat 7 provided by the training device 51 being attached to the rear side 15d of the floor engagement member 15 can be configured to provide a forward tilt that can help make it clear to a user that the user is to rest his or her buttocks on the seat while actively supporting the user's weight on the seat by the user's legs. The forward tilting of the seat 7 provided by the training device 51 can also help the user learn to balance while engaging the seat and sitting/or standing to avoid losing his or her balance while the user is leaning on the seat 7 or is sitting on the seat 7. Once the user has developed some physical awareness and muscle memory relating to balancing while the seat 7 is at a forward tilted position, the user may feel comfortable removing the training device 51 from the floor engagement member 15 by sliding the rear side 15d of the floor engagement member 15 out of the slot 53 to decouple the floor engagement member 15 from the training device 51. The seat may then rest at a flat position and the base 3 and vertical member 11 may extend vertically and not at an angle θ when the seating device 1 is in a non-used position and is at rest on a floor. When the user sits on the seat 7 for use of the seating device, the use may provide a force for rocking or tilting the seat to a desired degree based on the user's past experience in learning how to balance his or her weight while utilizing the seating device that was previously performed with the aid of the training device 51 being coupled to the floor engagement member 15. If so desired, the user may reattached the training device 51 to the floor engagement member 15 via the slot 53 for further training on how to balance his or her weight while the user's buttocks contacts the seat while the user is sitting or leaning on the seat 7.

It is contemplated that after 7-14 days of use of the training device 51 attached to the floor engagement member 15, a user will no longer need the training device coupled to the floor engagement member 15 to easily utilize the seating device while sitting and/or standing while the user's buttocks contacts the seat or otherwise at least partially engages the seat 7 to help support the weight of the user. But, some users may quickly learn how to balance themselves while other users may need a longer time period. The releasable attachability of the training device 51 to the floor engagement member 15 can help allow a user to proceed at his or her own pace for learning how to properly balance while using the seating device 1 and disconnect and reconnect the training device 51 as often as desired to facilitate the user's training. In some embodiments, it is contemplated that a user may prefer to always have the training device 51 coupled to the floor engagement member 15. The configuration of the slot 53 can help allow the user the option of keeping the training device 51 coupled to the floor engagement member 15 as preferred by such a user while allowing other users who may have different preferences for use and/or removal of the training devices 51 from their seating devices.

The training device 51 could be configured to have a different shaped body that is configured for releasable attachment to a bottom of the floor engagement member 15 adjacent to the rear side 15d or front side 15c of the floor engagement member 15. For instance, training device 51 shown in FIGS. 11-18 may be configured for releasable attachment to a bottom portion of the floor engagement member 15 adjacent its front side 15c or its rear side 15d.

For example, the training device 51 may have a body that is shaped to match a contour of the bottom portion of the floor engagement member 15 adjacent the front or rear side of that member to provide an additional thickness below the floor engagement member to tilt the seating device at an angle θ relative to vertical so that the seat 7 is supported at the angle θ relative to vertical (e.g. a 10° angle, a 15° angle, a 20° angle, a 25° angle, a 30° angle, a 35° angle, a 10-40° angle, etc.).

Figure 15:
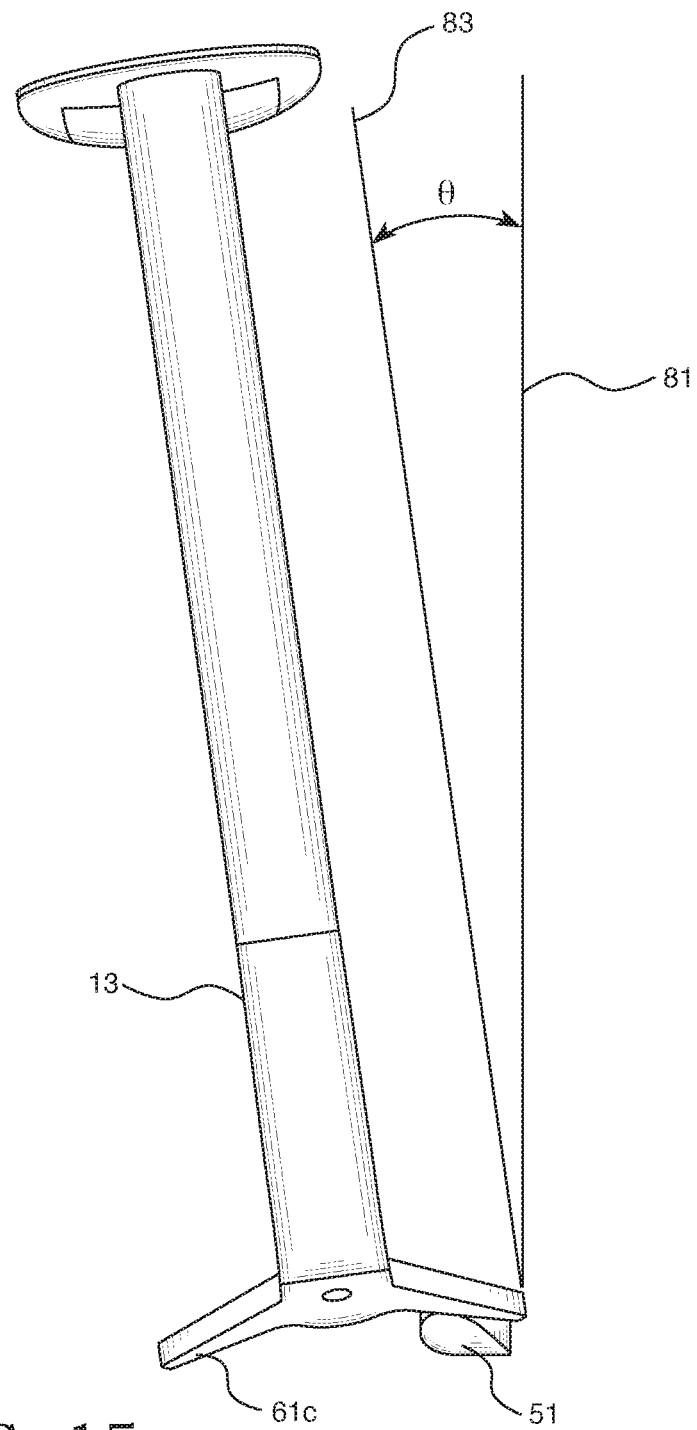
FIG. 15 is a side perspective view of the first exemplary embodiment of the seating device with a training device coupled to the base of the seating device.

As shown in FIG. 15, the angle θ of tilting may result in the seat 7 being oriented at a position indicated by line 83 that is at an angle θ relative to vertical as indicated by line 81. When the training device 51 is removed from the floor engagement member 15 and is removed from the base 2, the seating device may be oriented at rest as indicated by line 81 and be generally vertical in orientation so that the vertical member 11 is vertical and the top of the seat 7 is horizontally level. When the training device is coupled to the floor engagement member, the rest position of the seating device 1 may be tilted at the angle θ as indicated by line 83 such that the vertical member 11 extends from the base 3 at angle θ relative to vertical (e.g. at a 10° angle such that the base extends at an 80° incline, at a 15° angle such that the base extends at a 75° incline, etc.) and the seat 7 is no longer horizontally level, but is at an angle relative to horizontal due to the tilting provided by the training device 51. The angle at which the seat 7 is tilted may correspond to the angle at which the vertical member is tilted. For instance, the angle at which the seat is tilted may be between a 5° angle and a 35° angle relative to horizontal or may be positioned so that the surface of the seat 7 extends from its rear side to its forward side at between a 15-30° inclination or declination.

The body of the training device 51 may be elongated to have a first end 51e and a second end 51f that is opposite its first end 51e. A middle portion 51g of the body may be between the first and second ends 51e and 51f of the training body and be of a thinner thickness than these ends to define a curvature that defines an apex 51h at which the body is thinnest near in its middle portion 51g. The curvature may be defined in the top of the body so that the top of the body is contactable to the bottom of the floor engagement member 15 to match and/or correspond to the curvature of the bottom portion of the floor engagement member 15 to which the training device 51 is to connect. The contour of the body may be configured to provide a lifted support adjacent a side of the floor engagement member 15 to facilitate a forward tilting of the seat 7 at the pre-selected angle θ relative to vertical to help facilitate training of a use on how to sit, stand and/or otherwise lean on the seat 7 of the seating device 1 for using the seating device to support the user's body. For instance, the body of the training device 51 can be configured to provide a wedge of a between 2-10 centimeters, 1-15 centimeters, 5-15 centimeters, or 2-20 centimeters to help lift one side of the floor engagement member 15 above the opposite side of that floor engagement member 15 when the floor engagement member engages the floor to support the seat 7 to facilitate the forward tilting of the seat 7 when a user is not on the seat 7 or providing a force on the seat. Thereafter, a user may lean on the seat or otherwise transfer some of the user's weight onto the seat to adjust a position of the seat 7 from this tilted initial position to any desired position. Due to the forward tilting provided by the training device 51, a user may have difficulty tilting the seat 7 backwards sufficient to avoid losing the user's balance while sitting or leaning on the seat 7 or otherwise become unbalanced unless the user applies a relatively significant and intentional amount of force to effect such a backward tilting. Such a configuration of the training device 51 can help a user learn how to balance while seating or leaning on the seat 7 without unintentionally losing his or her balance.

The training device 51 can be removably coupled to the bottom of the floor engagement member by one or more releasably interlocking projections 69 (e.g. pin elements, protrusions, nubs, interlockable members, resilient fingers, protuberances, detent members, etc.). Projections 69 are shown in broken line in FIG. 11. The projections 69 can be sized and configured to extend into apertures 63 or 62 (e.g. holes, openings, slots, grooves, furrows, recesses, cavities, etc.) that may be defined in the bottom of the floor engagement member 15 adjacent to the front side 15c or rear side 15d of the floor engagement member 15 defined in the bottom portion of the floor engagement members to provide a resilient releasable connection between the bottom of the floor engagement member 15 and the top of the body of the training device 51.

Alternatively, the body of the training device can have the apertures and the bottom of the floor engagement member may have the projections (not shown). For such an alternative, the projections may be configured to be removable from the floor engagement member 15 after the training device is no longer needed by the user.

The apertures 63 and/or 62 can be defined within treaded portions of the floor engagement member 15. For instance, front treated portions 61c and rear treaded portions 61d of the floor engagement portion may be defined on the bottom of the floor engagement member adjacent to left and right sides of the front and rear of the floor engagement member. The apertures within the treaded portions can be configured to releasably couple the training device 51 to the floor engagement member 15.

Figure 11:
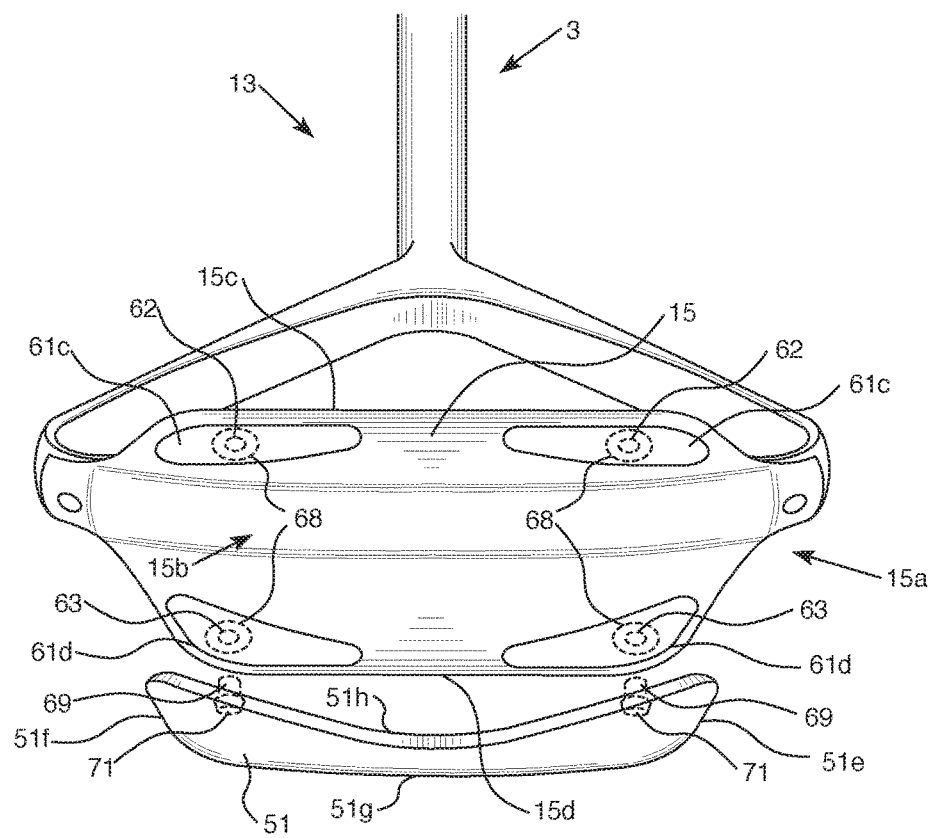
FIG. 11 is an exploded bottom fragmentary view of the first exemplary embodiment of the seating device with a training device coupled to the base of the seating device.
Figure 12:
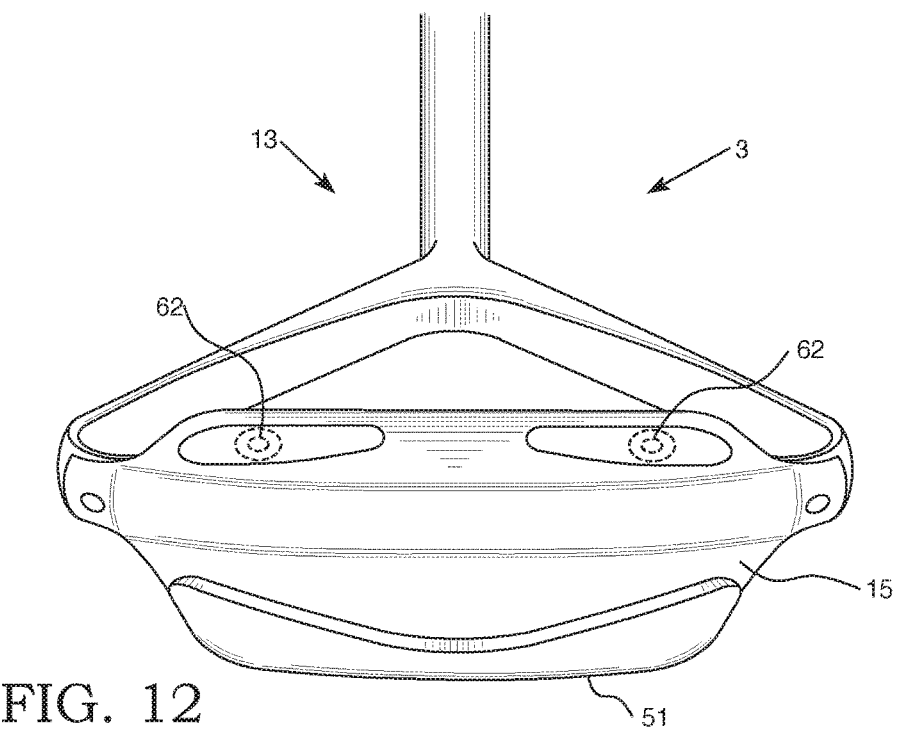
FIG. 12 is a fragmentary bottom view of the first exemplary embodiment of the seating device with a training device coupled to the base of the seating device.
Figure 13:
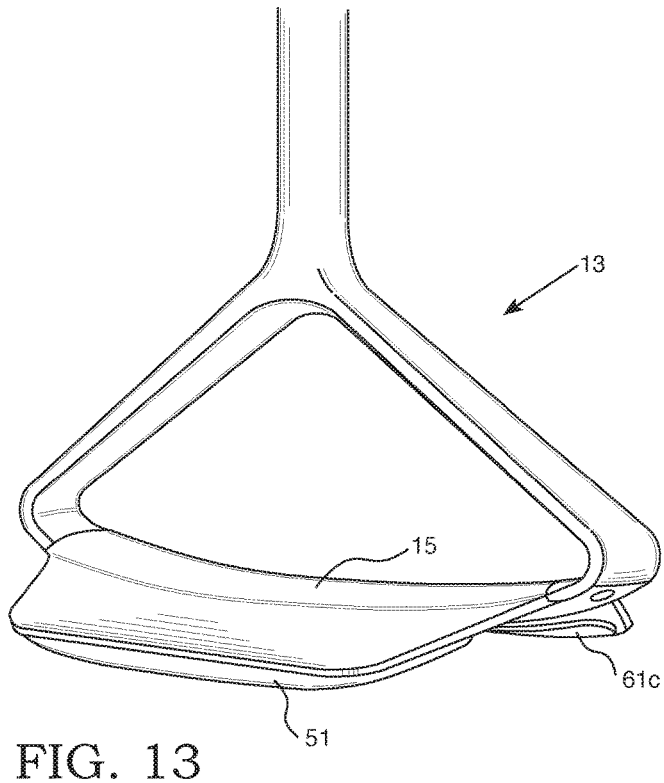
FIG. 13 is a fragmentary rear perspective view of the first exemplary embodiment of the seating device with a training device coupled to the base of the seating device.
Figure 14:
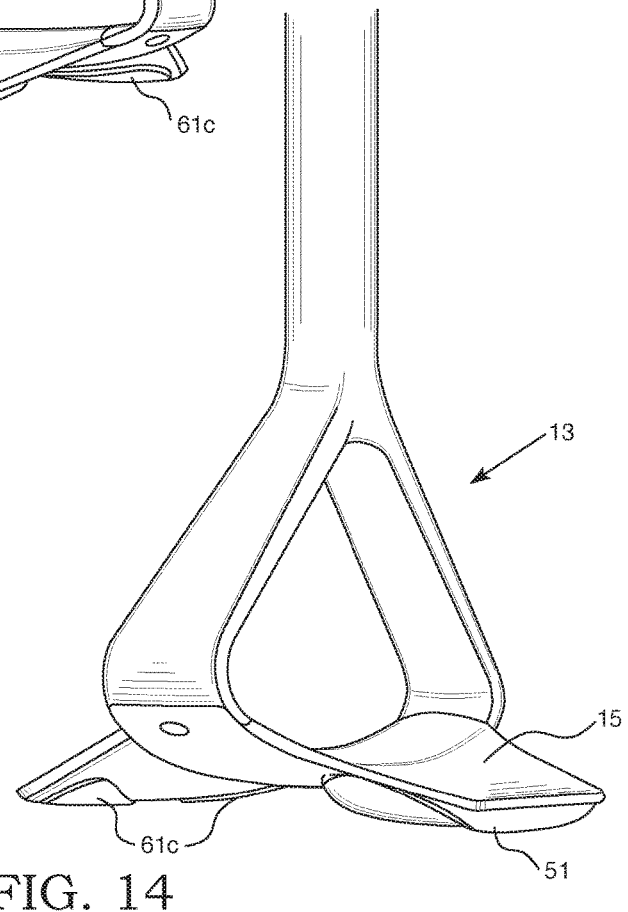
FIG. 14 is a fragmentary side perspective view of the first exemplary embodiment of the seating device with a training device coupled to the base of the seating device.

In some embodiments, the floor engagement member 15 may have magnetic members 68 adjacent the apertures 62 or 63 and the training device 51 can have magnetic elements 71 that are magnetically attractable to the magnetic members (e.g. magnetic members, members of metal that are magnetically attractive to magnets, etc.) of the floor engagement member 15 as shown in broken line in FIG. 11 to facilitate a releasable attachment of the training device 51 to the floor engagement member 15. In some embodiments, the magnetically attractive members of the floor engagement member 15 can be the fingers 19 that are positioned within the floor engagement member 15 or may be one or more other structures within the floor engagement member 15 that is composed of a metal that is attractive to a magnet that is to be positioned in locations that would correspond to locations at which magnetic elements 71 are located in or on the body of the training device.

In some embodiments, the magnetic elements 71 of the training device can be located adjacent to the top of the body and adjacent to the first and second sides 51e and 51f of the body to correspond to locations at which the magnetic members 68 of the floor engagement member 15 are located. For instance, the magnetic members 68 can be located adjacent the front and rear sides 15c and 15d of the floor engagement member adjacent to left and right sides of the floor engagement member 15. The attractive forces between the magnetic elements of the training device (e.g. magnets having a first polarity (e.g. a north or south polarity, etc.) or portions of the body that are composed of a magnetically attractive material) and the magnetic members of the floor engagement member 15 (e.g. magnets having a second polarity that is opposite of the first polarity so that they are attractable to the first polarity or members composed of a material attractive to the magnetic members) can help facilitate a releasable connection between the training device 51 and bottom of the floor engagement member 15. To disconnect the training device 51 from the floor engagement member 15, a user may simply provide a force that is sufficient to overcome the magnetic attractive forces and/or friction from a resilient projection/aperture mating connection provided between the training device 51 and the bottom of the floor engagement member 15. A user may reattach the removed training device 51 by reinserting projections 69 into the apertures and/or aligning the magnetic elements and members for recoupling the training device 51 to the floor engagement member 15.

An instructional member 91 may be releasably attached to the floor engagement member 15 and/or the training device 51 to help identify the training device 51 to a user and provide information to help a user learn how to use the seating device 1 and/or utilize the training device 51. For instance, the instructional member 91 may be an elongated member such as a ribbon, a cardboard sheet, a polymeric sheet, or other type of member that can be wrapped about a portion of the floor engagement member 15 for attachment to that member while also providing indicia, such as text and/or drawings that help identify the training device 51 and provide information to facilitate the use of the training device 51 and/or removal of that device.

For instance, the instructional member 91 can have a first end 91d and a second end 91e that is opposite its first end. A first side 91f of the instructional member may extend between the first and second ends 91d and 91e. A second side 91g that is opposite the first side 91f may also extend between the first and second ends 91d and 91e. The first and second sides may have indicia 91a, 91b, 91c and 91h printed thereon. The indicia can include text and illustrations that identify how to move the instructional member from the floor engagement member 15 to remove the instructional member, how to locate the training device 51, how to remove the training device 51 and how to orient the user's feet when sitting or leaning on the seat 7 of the seating device 1 while the training device 51 is coupled to the floor engagement member 15 to help facilitate use of the training device 51. For example, indicia 91c and 91h may be positioned to identify where the training device 51 is located. As another example, indicia 91a and 9b can provide information to a user to indicate that the instruction member should be removed prior to use of the seating device 1 and where the user's feet are to be located when sitting on the seat 7 while the training device 51 is coupled to the floor engagement member 15. In some embodiments, first, second and third indicia 91a, 91b, and 91h may be positioned on the first side 91f of the instructional member 91 and fourth indicia 91*c* may be positioned on the second side 91*g* of the instructional member 91. The positioning of the indicia may be via printing, use of stickers, or other mechanisms used to place text, illustrations, and/or other indicia on the instructional member 91. Other embodiments may have other indicia on either side to facilitate use of the training device 51 and/or removal of the training device 51 and/or removal of the instructional member 91.

Figure 16:
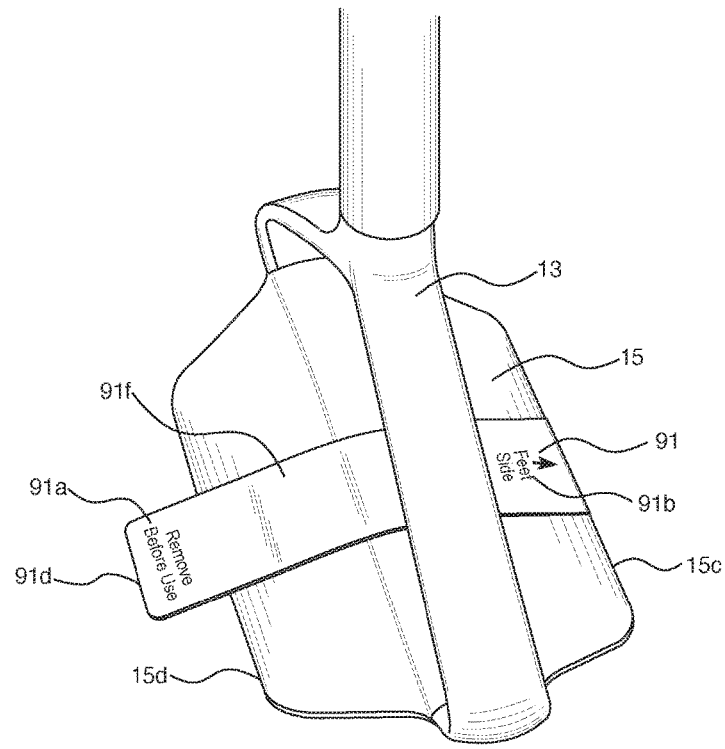
FIG. 16 is a top fragmentary view of the first exemplary embodiment of the seating device with an exemplary instructional member releasably connected to the base of the seating device.
Figure 17:
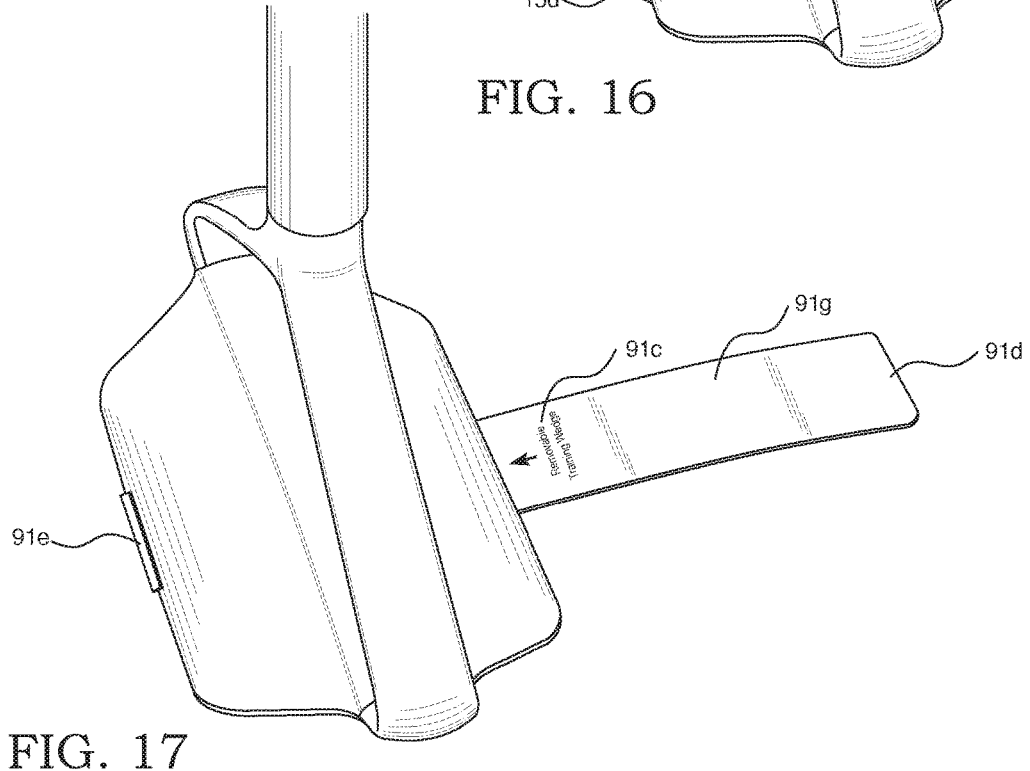
FIG. 17 is a top fragmentary view of the first exemplary embodiment of the seating device shown in FIG. 16 with the instructional member in a position illustrating a process by which the instructional member can be decoupled from the seating device.
Figure 18:
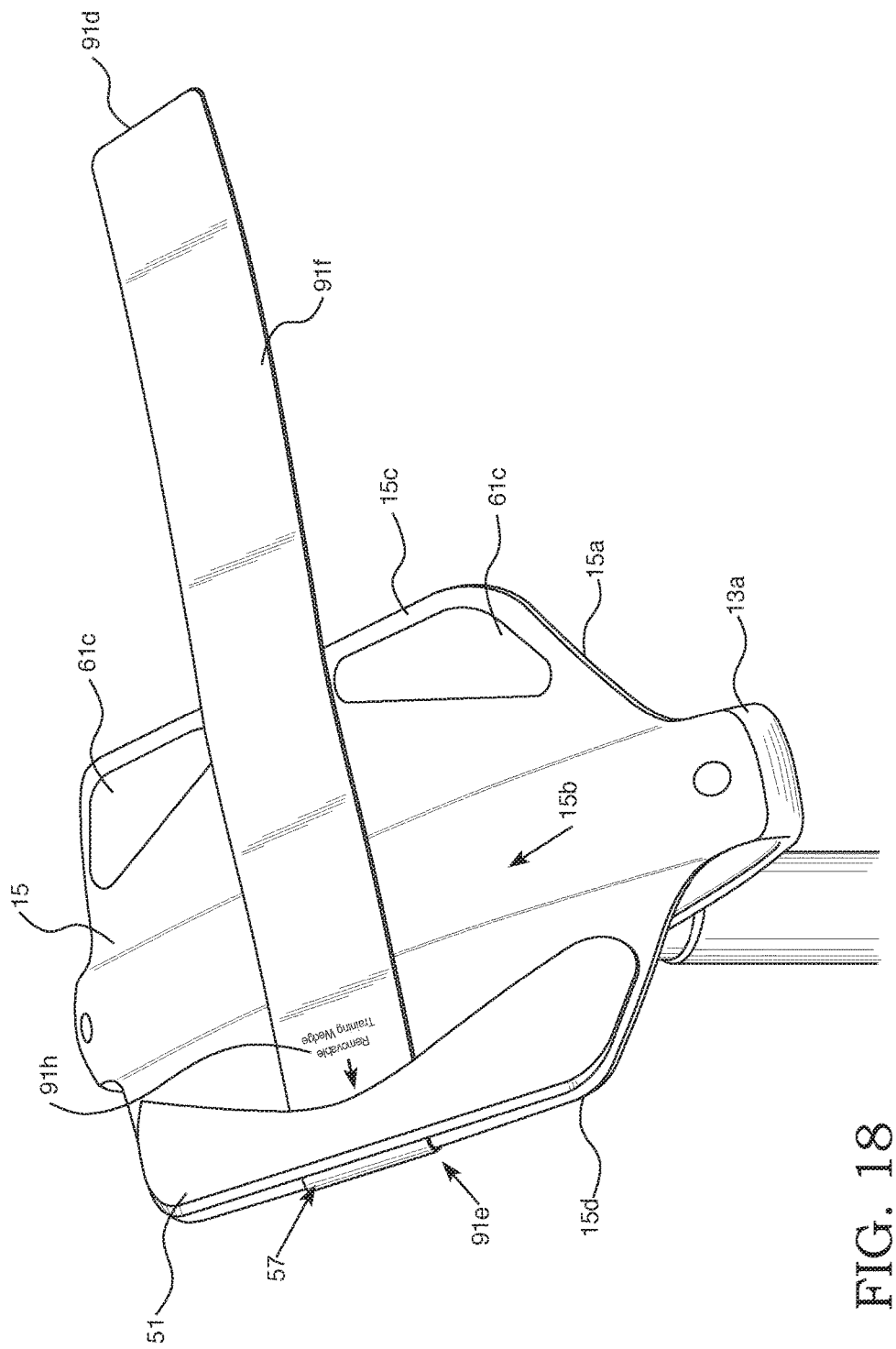
FIG. 18 is a bottom fragmentary view of the first exemplary embodiment of the seating device shown in FIG. 17 with the instructional member in the position illustrating a process by which the instructional member can be decoupled from the seating device.

When the instructional member is wrapped about the floor engagement member 15, the first and second ends 91*d* and 91*e* may contact each other or be adjacent to each other as shown in FIG. 16. The wrapped position of the instructional member may be configured so that a portion of the instructional member passes between the top of the training device 51 and the bottom of the floor engagement member 15. The first end 91*d* may be moved away from the second end as shown in FIGS. 17 and 18 to unwrap the instructional member 91 from the floor engagement member 15 and to allow other indicia to be visible to a user. The user may then slide the second end 91*e* away from the floor engagement member 15 to facilitate a removal of the unwrapped instructional member away from the floor engagement member 15.

It should be understood that different embodiments of the seating device and training device may be designed differently than the embodiments discussed herein to meet different design criteria. For example, the size and shape of the training device 51, the composition of the training device 51, and the location at which the training device 51 is connected to the base 3 of the seating device 1 may be different to meet a particular set of design objectives. As another example, the type of indicia used on an instructional member 91 may be other types of indicia or other arrangements of indicia to facilitate the identification of the training device 51 and help explain to a user how to use the training device 51 and how to remove the training device 51 from the seating device 1 and/or attach the training device 51 to the seating device 1. Therefore, while certain exemplary embodiments of seating devices and training devices for seating devices and methods of making and using the same have been discussed and illustrated herein, it is to be distinctly understood that the invention is not limited thereto but may be otherwise variously embodied and practiced within the scope of the following claims.

What is claimed is:

1. A method of using a seating device, the seating device comprising a seat to support a user, a floor engagement member that is elongated in a width direction, an elongated training device, and only a single leg extending at least part of a distance between the floor engagement member and the seat for interconnecting the seat with the floor engagement member, the method comprising:
   removably attaching the elongated training device to the floor engagement member of the seating device that engages a floor to tilt the leg of the seating device at a pre-selected angle in a forward or rearward direction that is transverse to the width direction, wherein the elongated training device extends lengthwise in the width direction along a forward edge or a rearward edge of the floor engagement member; and
   providing instructions on how to at least one of: (i) use the training device and (ii) remove the training device.

2. The method of claim 1, comprising:
   using the seating device with the training device attached to the floor engagement member to learn how to use the seating device, the using of the seating device being performed such that the seating device supports a weight of a user leaning on a seat of the sitting device or sitting on the seat of the sitting device;
   removing the training device from the seating device.

3. The method of claim 2, wherein the training device is removed after it is determined that the user has learned how to avoid losing balance while sitting or leaning on the seat of the seating device.

4. The method of claim 3, comprising:
   reattaching the training device to the floor engagement member after the training device is removed to facilitate training of at least one other user.

5. The method of claim 2, wherein the training device comprises a body that defines a slot, the slot sized and configured to receive a first side of the floor engagement member to tilt the leg at the pre-selected angle, the first side comprising the forward edge or the rearward edge.

6. The method of claim 2, wherein the training device is configured to be releasably connectable on a bottom of the floor engagement member adjacent a first side of the floor engagement member, the first side of the floor engagement member comprises the forward edge of the floor engagement member or the rearward edge of the floor engagement member.

7. The method of claim 6, wherein at least one of the floor engagement member and the training device is comprised of at least one magnetic element or at least one magnetic member to facilitate releasable connection between the bottom of the floor engagement member adjacent the first side of the floor engagement member and a top of the training device.

8. The method of claim 6, wherein the training device has a body having a first end, a second end, and a middle portion between the first and second ends, a first magnetic element being positioned adjacent the first end and a second magnetic element being positioned adjacent the second end; and
   wherein the floor engagement member has at least one magnetic member configured to magnetically attract at least one of the first magnetic element and the second magnetic element.

9. The method of claim 1, wherein the pre-selected angle is within a range of 5°-35°, 5°-25°, or 5°-15°.

10. The method of claim 9, wherein the pre-selected angle is 10°.

11. The method of claim 1, wherein the training device has a body that defines a slot, the slot sized and configured to receive a first side of the floor engagement member to tilt the leg at the pre-selected angle, the first side comprising the forward edge or the rearward edge of the floor engagement member.

12. The method of claim 11, wherein the first side of the floor engagement member is a rear side of the floor engagement member.

13. The method of claim 12, wherein the body of the training device has a top portion, a bottom portion, and middle portion between the top and bottom portion that defines the slot and wherein the bottom portion is spaced apart from the top portion via the middle portion and extends forwardly past the top portion.

14. The method of claim 1, wherein the training device is configured to be releasably connectable on a bottom of the floor engagement member adjacent a first side of the floor engagement member, the first side of the floor engagement member comprising the forward edge of the floor engagement member or the rearward edge of the floor engagement member.

15. The method of claim 14, wherein the first side of the floor engagement member is a rear side of the floor engagement member.

16. The method of claim 14, wherein the pre-selected angle is within a range of 5°-35°, 5°-25°, or 5°-15°.

17. The method of claim 16, wherein the pre-selected angle is 10°.

18. The method of claim 14, wherein at least one of the floor engagement member and the training device is comprised of at least one magnetic element or at least one magnetic member to facilitate releasable connection between the bottom of the floor engagement member adjacent the first side of the floor engagement member and a top of the training device.

19. The method of claim 14, wherein the training device has a body having a first end, a second end, and a middle portion between the first and second ends, a first magnetic element being positioned adjacent the first end and a second magnetic element being positioned adjacent the second end.

20. The method of claim 19, wherein the floor engagement member has at least one magnetic member configured to magnetically attract at least one of the first magnetic element and the second magnetic element.

21. The method of claim 19, wherein the floor engagement member has a first magnetic member configured to magnetically attract the first magnetic element and a second magnetic member configured to magnetically attract the second magnetic element to releasably connect the bottom of the floor engagement member to the training device.

22. The method of claim 14, wherein the training device has a body having a first end, a second end, and a middle portion between the first and second ends, a top of the body shaped such that the middle portion is at an apex of a curve defined by the top of the body to mate with a contour on the bottom of the floor engagement member.

23. The method of claim 1, comprising:
   providing an instructional member wrapped about the floor engagement member, the instruction member having at least a portion of the instructions, a portion of the instructional member being positioned between the training device and the floor engagement member.

\* \* \* \* \*